United States Patent
Omidvar Tehrani et al.

(10) Patent No.: US 11,490,220 B2
(45) Date of Patent: Nov. 1, 2022

(54) SYSTEM AND METHOD FOR ACCURATELY AND EFFICIENTLY GENERATING AMBIENT POINT-OF-INTEREST RECOMMENDATIONS

(71) Applicant: Naver Corporation, Seongnam-si (KR)

(72) Inventors: Bernard Omidvar Tehrani, Saint Martin d'Heres (FR); Sruthi Viswanathan, Grenoble (FR); Frederic Roulland, Le Versoud (FR)

(73) Assignee: Naver Corporation

( * ) Notice: Subject to any disclaimer, the term of this patent is extended or adjusted under 35 U.S.C. 154(b) by 147 days.

(21) Appl. No.: 16/945,043

(22) Filed: Jul. 31, 2020

(65) Prior Publication Data

US 2021/0160653 A1 May 27, 2021

(30) Foreign Application Priority Data

Nov. 26, 2019 (EP) ..................................... 19306522

(51) Int. Cl.
*H04W 4/021* (2018.01)
*H04W 4/024* (2018.01)
(Continued)

(52) U.S. Cl.
CPC ........ *H04W 4/021* (2013.01); *G06F 16/9535* (2019.01); *G06F 16/9536* (2019.01); *H04W 4/024* (2018.02)

(58) Field of Classification Search
CPC ............ G06F 16/9535; G06F 16/9536; G06Q 30/0631; H04W 4/021; H04W 4/024
See application file for complete search history.

(56) References Cited

U.S. PATENT DOCUMENTS

2012/0233238 A1 9/2012 Braginsky et al.
2013/0311567 A1* 11/2013 Lee .......................... H04L 51/20
709/204
(Continued)

FOREIGN PATENT DOCUMENTS

WO WO2017193666 11/2017

OTHER PUBLICATIONS

Agrawal, Rakesh, and Ramakrishnan Srikant. 'Fast Algorithms for Mining Association Rules', 487-99, 1994. 1994.
(Continued)

*Primary Examiner* — Kashif Siddiqui
(74) *Attorney, Agent, or Firm* — Michael J. Nickerson; Basch & Nickerson LLP

(57) ABSTRACT

A computer-implemented method for accurately and efficiently generating ambient point-of-interest recommendations electronically obtains a plurality of points-of-interest for an area, the area being an area selected by a user associated with a location of the user; electronically retrieves point-of-interest data including visitor information about visitors associated with the obtained plurality of points-of-interest and information about the obtained plurality of points-of-interest; electronically forms a plurality of groups based upon the visitor information, each group of the plurality of groups being associated with a point-of-interest of the obtained plurality of points-of-interest; electronically determines a mindset function from a plurality of mindset functions, the mindset function including a predefined function; electronically determines a group from the plurality of groups based upon the information about the obtained plurality of points-of-interest and the determined mindset function; and communicates a point-of-interest of the obtained plurality of points-of-interest to the user, the point-of-interest being associated with the determined group.

40 Claims, 5 Drawing Sheets

(51) Int. Cl.
*G06F 16/9535* (2019.01)
*G06F 16/9536* (2019.01)

(56) References Cited

U.S. PATENT DOCUMENTS

| | | | | |
|---|---|---|---|---|
| 2014/0189802 | A1* | 7/2014 | Montgomery | H04L 63/083 726/4 |
| 2014/0310739 | A1* | 10/2014 | Ricci | G06F 21/31 725/75 |
| 2018/0054712 | A1* | 2/2018 | Ahuja | H04W 4/33 |
| 2019/0281407 | A1 | 9/2019 | Tian | |
| 2020/0320592 | A1* | 10/2020 | Soule | G06F 16/9535 |

OTHER PUBLICATIONS

Aliannejadi, Mohammad, and Fabio Crestani. 'Personalized Context-Aware Point of Interest Recommendation'. ACM Transactions on Information Systems 36, No. 4. Oct. 2018. 2018.

Anand, Sarabjot Singh, and Bamshad Mobasher. 'Contextual Recommendation'. In From Web to Social Web: Discovering and Deploying User and Content Profiles, edited by Bettina Berendt, Andreas Hotho, Dunja Mladenic, and Giovanni Semeraro, 4737:142-60. Lecture Notes in Computer Science. Berlin, Heidelberg: Springer Berlin Heidelberg, 2007. 2007.

Backstrom, Lars, Eric Sun, and Cameron Marlow. 'Find Me If You Can: Improving Geographical Prediction with Social and Spatial Proximity'. In Proceedings of the 19th International Conference on World Wide Web—WWW'10, 61. Raleigh, North Carolina, USA: ACM Press, 2010. 2010.

Bahir, Eitan, and Ammatzia Peled. 'Identifying and Tracking Major Events Using Geo-Social Networks'. Social Science Computer Review 31, No. 4. Aug. 2013. 2013.

Bao, Jie, Yu Zheng, David Wilkie, and Mohamed Mokbel. 'Recommendations in Location-Based Social Networks: A Survey'. GeoInformatica 19, No. 3 (Jul. 2015): 525-65. 2015.

Baral, Ramesh, and Tao Li. 'PERS: A Personalized and Explainable POI Recommender System'. ArXiv:1712.07727 [Cs], Dec. 20, 2017. 2017.

Battle, Leilani, Remco Chang, and Michael Stonebraker. 'Dynamic Prefetching of Data Tiles for Interactive Visualization'. In Proceedings of the 2016 International Conference on Management of Data, 1363-75. San Francisco California USA: ACM, 2016. 2016.

Berjani, Betim, and Thorsten Strufe. 'A Recommendation System for Spots in Location-Based Online Social Networks'. In Proceedings of the 4th Workshop on Social Network Systems—SNS '11, 1-6. Salzburg, Austria: ACM Press, 2011. 2011.

Cao, Xin, Gao Cong, and Christian S. Jensen. 'Mining Significant Semantic Locations from GPS Data'. Proceedings of the VLDB Endowments, No. 1-2. Sep. 2010 2010.

Carpineto, Claudio, Stefano Mizzaro, Giovanni Romano, and Matteo Snidero. 'Mobile Information Retrieval with Search Results Clustering: Prototypes and Evaluations'. Journal of the American Society for Information Science and Technology 60, No. 5. May 2009. 2009.

Cheng, Chen, Haiqin Yang, Irwin King, and Michael R Lyu. 'Fused Matrix Factorization with Geographical and Social Influence in Location-Based Social Networks', AAAI Conference on AI, 2012. 2012.

Cho, Eunjoon, Seth A. Myers, and Jure Leskovec. 'Friendship and Mobility: User Movement in Location-Based Social Networks'. In Proceedings of the 17th ACM SIGKDD International Conference on Knowledge Discovery and Data Mining—KDD '11, 1082. San Diego, California, USA: ACM Press, 2011. 2011.

Chung, Hangil, Daniel Freund, and David B. Shmoys. 'Bike Angels: An Analysis of Citi Bike's Incentive Program'. In Proceedings of the 1st ACM SIGCAS Conference on Computing and Sustainable Societies, 1-9. COMPASS '18. New York, NY, USA: Association for Computing Machinery, 2018. 2018.

Dingqi Yang, Daqing Zhang, Vincent W. Zheng, and Zhiyong Yu. 'Modeling User Activity Preference by Leveraging User Spatial Temporal Characteristics in LBSNs'. IEEE Transactions on Systems, Man, and Cybernetics: Systems 45, No. 1. Jan. 2015 2015.

Du, Fan, Catherine Plaisant, Neil Spring, and Ben Shneiderman. 'Finding Similar People to Guide Life Choices: Challenge, Design, and Evaluation'. In Proceedings of the 2017 CHI Conference on Human Factors in Computing Systems, 5498-5544. Denver Colorado USA: ACM, 2017. 2017.

Fekete, Jean-Daniel, Danyel Fisher, Arnab Nandi, and Michael Sedlmair. Progressive Data Analysis and Visualization. 2018. 2018.

Feng, Kaiyu, Gao Cong, Sourav S. Bhowmick, Wen-Chih Peng, and Chunyan Miao. 'Towards Best Region Search for Data Exploration'. In Proceedings of the 2016 International Conference on Management of Data, 1055-70. San Francisco California USA: ACM, 2016. 2016.

Feng, Shanshan, Xutao Li, Yifeng Zeng, Gao Cong, Yeow Meng Chee, and Quan Yuan. 'Personalized Ranking Metric Embedding for Next New POI Recommendation', 2015. 2015.

Ference, Gregory, Mao Ye, and Wang-Chien Lee. 'Location Recommendation for Out-of-Town Users in Location-Based Social Networks'. In Proceedings of the 22nd ACM International Conference on Conference on Information & Knowledge Management—CIKM '13, 721-26. San Francisco, California, USA: ACM Press, 2013. 2013.

Gao, Huiji, Jiliang Tang, Xia Hu, and Huan Liu. 'Content-Aware Point of Interest Recommendation on Location-Based Social Networks', AAAI on AI, 2015. 2015.

Gao, Huiji, Jiliang Tang, Xia Hu, and Huan Liu. 'Modeling Temporal Effects of Human Mobile Behavior on Location-Based Social Networks'. In Proceedings of the 22nd ACM International Conference on Conference on Information & Knowledge Management—CIKM '13, 1673-78. San Francisco, California, USA: ACM Press, 2013. 2013.

Geng, Liqiang, and Howard J. Hamilton. 'Interestingness Measures for Data Mining: A Survey'. ACM Computing Surveys 38, No. 3, Sep. 30, 2006. 2006.

Getoor, Lise, and Christopher P. Diehl. 'Link Mining: A Survey'. ACM Sigkdd Explorations Newsletter 7, No. 2 (Dec. 2005): 3-12. 2005.

Goldenberg, Jacob, and Moshe Levy. 'Distance Is Not Dead: Social Interaction and Geographical Distance in the Internet Era', 2009. 2009.

Griesner, Jean-Benoit, Talel Abdessalem, and Hubert Naacke. 'POI Recommendation: Towards Fused Matrix Factorization with Geographical and Temporal Influences'. In Proceedings of the 9th ACM Conference on Recommender Systems, 301-4. Vienna Austria: ACM, 2015. 2015.

Gundecha, Pritam, Geoffrey Barbier, and Huan Liu. 'Exploiting Vulnerability to Secure User Privacy on a Social Networking Site'. In Proceedings of the 17th ACM SIGKDD International Conference on Knowledge Discovery and Data Mining—KDD '11, 511. San Diego, California, USA: ACM Press, 2011. 2011.

Heart Marti. Search User Interfaces, Cambridge University Press, 2009. 2009.

Heimonen, Tomi. 'Mobile Findex: Facilitating Information Access in Mobile Web Search with Automatic Result Clustering'. Advances in Human-Computer Interaction 2008. 2008.

Hu, Bo, and Martin Ester. 'Spatial Topic Modeling in Online Social Media for Location Recommendation'. In Proceedings of the 7th ACM Conference on Recommender Systems, 25-32. Hong Kong China: ACM, 2013. 2013.

Jamali, Mohsen, and Martin Ester. 'A Matrix Factorization Technique with Trust Propagation for Recommendation in Social Networks'. In Proceedings of the Fourth ACM Conference on Recommender Systems—ReeSys '10, 135. Barcelona, Spain: ACM Press, 2010. 2010.

Jamali, Mohsen, and Martin Ester. 'TrustWalker: A Random Walk Model for Combining Trust-Based and Item-Based Recommendation'. In Proceedings of the 15th ACM SIGKDD International Conference on Knowledge Discovery and Data Mining, 397-406. KDD '09. New York, NY, USA: Association for Computing Machinery, 2009. 2009.

(56) References Cited

OTHER PUBLICATIONS

Jhaver, Shagun, Yoni Karpfen, and Judd Antin. 'Algorithmic Anxiety and Coping Strategies of Airbnb Hosts'. In Proceedings of the 2018 CHI Conference on Human Factors in Computing Systems, 1-12. Montreal QC Canada ACM, 2018. 2018.
Koren, Yehuda, Robert Bell, and Chris Volinsky. 'Matrix Factorization Techniques for Recommender Systems'. Computer 42, No. 8, Aug. 2009. 2009.
Lalwani, Deepika, D. V. L. N. Somayajulu, and P. Radha Krishna. 'A Community Driven Social Recommendation System'. In 2015 IEEE International Conference on Big Data (Big Data), 821-26. Santa Clara, CA, USA: IEEE, 2015. 2015.
Lev, Justin J., Mohamed Sarwat, Ahmed Eldawy, and Mohamed F. Mokbel. Lars: A Location-Aware Recommender System, 2012. 2012.
Li, Huayu, Yong Ge, Richang Hong, and Hengshu Zhu. 'Point-of-Interest Recommendations: Learning Potential Check-Ins from Friends'. In Proceedings of the 22nd ACM SIGKDD International Conference on Knowledge Discovery and Data Mining, 975-84. San Francisco California USA: ACM, 2016. 2016.
Li, Xutao, Gao Cong, Xiao-Li Li, Tuan-Anh Nguyen Pham, and Shonali Krishnaswamy. 'Rank-GeoFM: A Ranking Based Geographical Factorization Method for Point of Interest Recommendation'. In Proceedings of the 38th International ACM SIGIR Conference on Research and Development in Information Retrieval, 433-42. Santiago Chile ACM, 2015. 2015.
Li, Yize, Jiazhong Nie, Yi Zhang, Bingqing Wang, Baoshi Yan, and Fuliang Weng. 'Contextual Recommendation Based on Text Mining', Coling 2010. 2010.
Lian, Defu, Cong Zhao, Xing Xie, Guangzhong Sun, Enhong Chen, and Yong Rui. 'GeoMF: Joint Geographical Modeling and Matrix Factorization for Point-of-Interest Recommendation'. In Proceedings of the 20th ACM SIGKDD International Conference on Knowledge Discovery and Data Mining, 831-40. New York New York USA: ACM, 2014. 2014.
Liu, Bin, Yanjie Fu, Zijun Yao, and Hui Xiong. 'Learning Geographical Preferences for Point-of-Interest Recommendation'. In Proceedings of the 19th ACM SIGKDD International Conference on Knowledge Discovery and Data Mining, 1043-51. Chicago Illinois USA: ACM, 2013. 2013.
Liu, Mengxiong, Zhengchao Liu, Chao Zhang, Keyang Zhang, Quan Yuan, Tim Hanratty, and Jiawei Han. 'Urbanity: A System for Interactive Exploration of Urban Dynamics from Streaming Human Sensing Data'. In Proceedings of the 2017 ACM on Conference on Information and Knowledge Management, 2503-6. Singapore Singapore: ACM, 2017. 2017.
Liu, Xin, Yong Liu, Karl Aberer, and Chunyan Miao. 'Personalized Point-of-Interest Recommendation by Mining Users' Preference Transition'. In Proceedings of the 22nd ACM International Conference on Conference on Information & Knowledge Management—CIKM '13, 733-38. San Francisco, California, USA: ACM Press, 2013. 2013.
Liu, Yiding, Tuan-Anh Nguyen Pham, Gao Cong, and Quan Yuan. 'An Experimental Evaluation of Point-of-Interest Recommendation in Location-Based Social Networks'. Proceedings of the VLDB Endowment 10, No. 10 (Jun. 2017) 1010-21. 2017.
Liu, Yong, Wei Wei, Aixin Sun, and Chunyan Miao. 'Exploiting Geographical Neighborhood Characteristics for Location Recommendation'. In Proceedings of the 23rd ACM International Conference on Conference on Information and Knowledge Management, 739-48. Shanghai China: ACM, 2014. 2014.
Ma, Hao, Chao Liu, Irwin King, and Michael R Lyu. 'Probabilistic Factor Models for Web Site Recommendation', SIGIR, 2011. 2011.
Ma, Hao, Haixuan Yang, Michael R. Lyu, and Irwin King. 'SoRec: Social Recommendation Using Probabilistic Matrix Factorization'. In Proceeding of the 17th ACM Conference on Information and Knowledge Mining—CIKM '08, 931. Napa Valley, California, USA: ACM Press, 2008. 2008.

Mok, Diana, Barry Wellman, and Juan Carrasco. 'Does Distance Matter in the Age of the Internet?' Urban Studies 47, No. 13, Nov. 2010. 2010.
Nandi, Arnab, and H. V. Jagadish. 'Guided Interaction: Rethinking the Query-Result Paradigm'. Proceedings of the VLDB Endowment 4, No. 12, Aug. 2011. 2011.
Noulas, Anastasios, Salvatore Scellato, Neal Lathia, and Cecilia Mascolo. 'A Random Walk around the City: New Venue Recommendation in Location-Based Social Networks'. In 2012 International Conference on Privacy, Security, Risk and Trust and 2012 International Confernece on Social Computing, 144-53. Amsterdam, Netherlands: IEEE, 2012. 2012.
Oliveira, Guilherme N., Jose L. Sotomayor, Rafael P. Torchelsen, Cláudio T. Silva, and João L.D. Comba. 'Visual Analysis of Bike-Sharing Systems'. Computers & Graphics 60, Nov. 2016. 2016.
Omidvar-Tehrani, Behrooz, and Sihem Amer-Yahia. 'User Group Analytics Survey and Research Opportunities'. IEEE Transactions on Knowledge and Data Engineering, 2020. 2020.
Omidvar-Tehrani, Behrooz, Sihem Amer-Yahia, and Ria Mae Borromeo. 'User Group Analytics: Hypothesis Generation and Exploratory Analysis of User Data'. The VLDB Journal 28, No. 2, Apr. 2019. 2019.
Paay, Jeni, Jesper Kjeldskov, Mikael B. Skov, Per M. Nielsen, and Jon Pearce. 'Discovering Activities in Your City Using Transitory Search'. In Proceedings of the 18th International Conference on Human-Computer Interaction with Mobile Devices and Services, 387-93. Florence Italy: ACM, 2016. 2016.
Pahins, Cicero A. L., Behrooz Omidvar-Tehrani, Sihem Amer-Yahia, Valerie Siroux, Jean-Louis Pepin, Jean-Christian Borel, and João L. D. Comba. 'COVIZ: a System for Visual Formation and Exploration of Patient Cohorts'. Proceedings of the VLDB Endowment 12, No. 12, Aug. 2019. 2019.
Tobler, W. R. 'A Computer Movie Simulating Urban Growth in the Detroit Region'. Economic Geography 46, Jun. 1970. 1970.
Ugarte, Willy, Patrice Boizumault, Samir Loudni, and Bruno Cremilleux. 'Computing Skypattern Cubes', ECAI 2014 2014.
Vaittinen, Tuomas, and David McGookin. 'Uncover: Supporting City Exploration with Egocentric Visualizations of Location-Based Content'. Personal and Ubiquitous Computing 22, No. 4 (Aug. 2018): 807-24. 2018.
Viswanathan, Sruthi, Cecile Boulard, and Antonietta Maria Grasso. 'Ageing Clouds: Novel yet Natural Support for Urban Exploration'. In Companion Publication of the 2019 on Designing Interactive Systems Conference 2019 Companion, 313-17. San Diego CA USA: ACM, 2019. 2019.
Wang, Hao, Manolis Terrovitis, and Nikos Mamoulis. 'Location Recommendation in Location-Based Social Networks Using User Check-in Data'. In Proceedings of the 21st ACM SIGSPATIAL International Conference on Advances in Geographic Information Systems, 374-83. Orlando Florida: ACM, 2013. 2013.
Wiese, Jason, Patrick Gage Kelley, Lorrie Faith Cranor, Laura Dabbish, Jason I Hong, and John Zimmerman. 'Are You Close with Me? Are You Nearby?: Investigating Social Groups, Closeness, and Willingness to Share', UbiComp 2011 2011.
Xiang, Liang, Quan Yuan, Shiwan Zhao, Li Chen, Xiatian Zhang, Qing Yang, and Jimeng Sun. 'Temporal Recommendation on Graphs via Long- and Short-Term Preference Fusion'. In Proceedings of the 16th ACM SIGKDD International Conference on Knowledge Discovery and Data Mining—KDD '10, 723. Washington, DC, USA: ACM Press, 2010. 2010.
Xu, Zheng, Yunhuai Liu, Neil Y. Yen, Lin Mei, Xiangfeng Luo, Xiao Wei, and Chuanping Hu. 'Crowdsourcing Based Description of Urban Emergency Events Using Social Media Big Data'. IEEE Transactions on Cloud Computing 8, No. 2. Apr. 2020 2020.
Ye, Mao, Peifeng Yin, and Wang-Chien Lee. 'Location Recommendation for Location-Based Social Networks'. In Proceedings of the 18th SIGSPATIAL International Conference on Advances in Geographic Information Systems—GIS '10, 458. San Jose, California: ACM Press, 2010. 2010.
Ye, Mao, Peifeng Yin, Wang-Chien Lee, and Dik-Lun Lee. 'Exploiting Geographical Influence for Collaborative Point-of-Interest Recommendation'. In Proceedings of the 34th International ACM

(56) References Cited

OTHER PUBLICATIONS

SIGIR Conference on Research and Development in Information—SIGIR '11, 325. Beijing, China: ACM Press, 2011. 2011.
Yin, Hongzhi, Bin Cui, Yizhou Sun, Zhiting Hu, and Ling Chen. 'LCARS: a Spatial Item Recommender System'. ACM Transactions on Information Systems 32, No. 3. Jun. 2014. 2014.
Zhang, Da-Chuan, Mei Li, and Chang-Dong Wang. 'Point of Interest Recommendation with Social and Geographical Influence'. In 2016 IEEE International Conference on Big Data (Big Data), 1070-75. Washington DC,USA: IEEE, 2016. 2016.
Zhang, Jia-Dong, Chi-Yin ChowMember, and Yanhua Li. 'IGeoRec: A Personalized and Efficient Geographical Location Recommendation Framework'. IEEE Transactions on Services Computing 8, No. 5. Sep. 2015. 2015.
Zhou, Xiao, Desislava Hristova, Anastasios Noulas, and Cecilia Mascolo. 'Detecting Socio-Economic Impact of Cultural Investment Through Geo-Social Network Analysis', AAAI, 2017. 2017.
European Search Report for EP 19306522.4 (dated Mar. 30, 20) Mar. 30, 2020.

* cited by examiner

SYSTEM AND METHOD FOR ACCURATELY AND EFFICIENTLY GENERATING AMBIENT POINT-OF-INTEREST RECOMMENDATIONS

PRIORITY INFORMATION

Pursuant to 35 U.S.C. § 119 (a), this application claims the benefit of an earlier filing date and the right of priority to European Patent Application Number EP 19306522, filed on Nov. 26, 2019, the contents of which are hereby incorporated by reference in their entirety.

BACKGROUND

Point-of-interest recommendation is a prominent application in location-based services. Point-of-interest recommendation systems are a special use of recommender systems. The literature contains personalized and socialized Point-of-interest recommendation approaches, where historical check-ins and social links are exploited to predict which Point-of-interest should be recommended to users to visit next.

Personalization has been the focus of many approaches, such as those proposed in the past by Levandoski et al. (Justin J Levandoski, Mohamed Sarwat, Ahmed Eldawy, and Mohamed F Mokbel: "A location-aware recommender system", in 2012 IEEE 28th international conference on data engineering), Ye et al. (Mao Ye, Peifeng Yin, and Wang-Chien Lee: "Location recommendation for location-based social networks", in SIGSPATIAL), Cao et al. (Xin Cao, Gao Cong, and Christian S Jensen: "Mining significant semantic locations from gps data", VLDB, 2010) and Liu et al. (Bin Liu, Yanjie Fu, Zijun Yao, and Hui Xiong, "Learning geographical preferences for Point-of-Interes recommendation", in Proceedings of the 19th ACM SIGKDD international conference on Knowledge discovery and data mining, 2013), where historical check-ins are exploited to predict which Point-of-interest the user prefers to visit next, using techniques such as Matrix Factorization and Poisson Factor Modeling.

Socialization has been addressed in approaches, such as approaches proposed by Hu (Bo Hu and Martin Ester: "Spatial topic modeling in online social media for location recommendation", in RecSys, 2013), Backstrom et al. (Lars Backstrom, Eric Sun, and Cameron Marlow: "Find me if you can: improving geographical prediction with social and spatial proximity", in Proceedings of the 19th international conference on World wide web, 2010) and Liu et al. (Yong Liu, Wei Wei, Aixin Sun, and Chunyan Miao: "Exploiting geographical neighborhood characteristics for location recommendation", in Proceedings of the 23rd ACM International Conference on Conference on Information and Knowledge Management, 2014), where information encapsulated in Location-based social networks (LBSN) are employed to predict user's preferences using link-based methods.

Traditionally, the problem of Point-of-interest recommendation is defined as learning users' implicit preferences according to user's historical check-ins (Jie Bao, Yu Zheng, David Wilkie, and Mohamed Mokbel: "Recommendations in location-based social networks: a survey", GeoInformatica, 2015). To solve this problem, an approach is to employ memory-based and model based Collaborative Filtering (CF) as de facto methods, where the check-ins matrix is used for learning preferences (Betim Berjani and Thorsten Strufe: "A recommendation system for spots in location-based online social networks", in Proceedings of the 4$^{th}$ workshop on social network systems, 2011).

However, this approach requires personal data of the user. Obtaining personal data of a user provides a security risk for the user, since this data may be intercepted. Moreover, when conventional methods do not have access to the personal data of a user a plurality of functions of these state-of-the-art-methods cannot be used or the method may not function in a desired way. This problem is also known under the term "the cold start challenge."

To tackle the challenge of a cold start, it has been proposed to enrich a sparse check-in matrix with social aspects, such as friendship links (Mohsen Jamali and Martin Ester. Trustwalker: "a random walk model for combining trust-based and item-based recommendation", in Proceedings of the 15th ACM SIGKDD international conference on Knowledge discovery and data mining, 2009). The assumption is that users may be more interested to visit places that their friends visited in the past. For example, friendship links are exploited in an approach proposed by Lalwani et al. (Deepika Lalwani, Durvasula VLN Somayajulu, and P Radha Krishna: "A community driven social recommendation system", in 2015 IEEE International Conference on Big Data (Big Data), IEEE, 2015) to build friend groups using Community Detection techniques.

Category-based search interfaces (see Tomi Heimonen: "Mobile findex: Facilitating information access in mobile web search with automatic result clustering", advances in Human-Computer Interaction, 2008) capture explicit needs of users in the form of categories (e.g., selecting Point-of-interests of the category "historical landmarks"). Categories may enable more personalization for users, resulting in less anxiety and more trust in the system. However, realistic scenarios often contain ambiguous needs and intents, where users seek to disambiguate in an iterative process. The only possible iteration in traditional search paradigms is to restart a search with another category.

The literature has also investigated using geographical contexts. The geographical context is mainly encapsulated in the form of "distance". While a geographical context captures some aspects of user's actual needs, there are still many fundamental user needs which have remained unaddressed. For example, the user's intents, actual situation, time in combination with a distance and emotion are difficult to capture.

State-of-the-art methods show fundamental problems. Some of these problems are:

Cold start and data sparsity. The problem of cold start arises when a user with a limited history of check-ins asks for recommendations. Data sparsity refers to the lack of data for identifying similarities between users. Many users employ Point-of-interest services without signing in. As a result, no social graph (i.e., friendship relations) can be retrieved. A typical recommendation system, which relies on historical check-ins and user similarities for personalized and socialized recommendations, is unable to output results in the presence of cold start and data sparsity. There are two kinds of users which may cause a cold start: (i) a new user with no history, (ii) a user with privacy concerns who does not want his/her data to be exploited.

Interpretations of interactions. Most Point-of-interest recommendation systems assume the process to be one-shot, where the user enters the system with a clear unambiguous intent, and the system returns the most interesting Point-of-interests which relates to that intent. In practice, this assumption is not realistic. Users may want to interact with the system to gradually build their intent. The challenge with multi-shot recommendation systems is that it is not clear how user interactions with the system should influence the recommendation strategy.

Context integration. Another challenge for an ambient Point-of-interest recommender is to integrate the context of the user into the recommendation process. The context is not limited to time and/or location, but also to the user's mindset at the time of receiving recommendations. For instance, different Point-of-interests should be recommended in case the user is hungry, or in case the user is seeking some personal relaxation time.

Explainability. Users may not trust in what they get from the recommender, i.e., algorithmic anxiety due to the cold start problem and session-based interactions with the system. Users may want to know why they received certain Point-of-interests as recommendation results. The challenge of recommendation transparency is a long-standing problem.

Accordingly, there is a need in the art to address the problems, discussed above, with respect to Point-of-interest recommendations.

It is therefore desirable to provide an improved method of Point-of-interest recommendation that overcomes the above disadvantages of the prior art.

Moreover, it is desirable to provide a method that accurately, efficiently, and effectively generates Point-of-interest recommendations in a secure manner

BRIEF DESCRIPTION OF THE FIGURES

The accompanying drawings are incorporated into and form a part of the specification for the purpose of explaining the principles of the embodiments. The drawings are not to be construed as limiting the embodiments to only the illustrated and described embodiments of how they can be made and used. Further features and advantages will become apparent from the following and more particularly from the description of the embodiments, as illustrated in the accompanying drawings, wherein.

DETAILED DESCRIPTION

Described herein are systems and methods for Point-of-interest recommendation. For purposes of explanation, numerous examples and specific details are set forth in order to provide a thorough understanding of the described embodiments.

Figure 1:
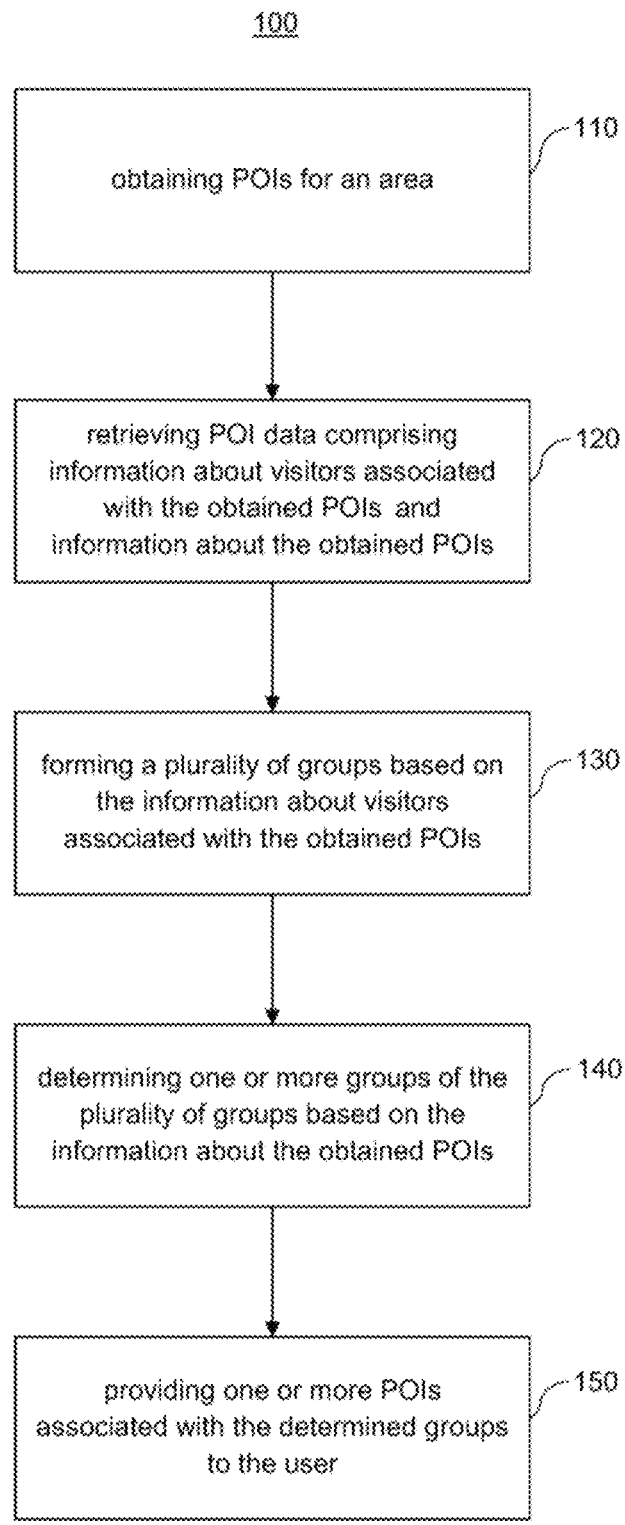
FIG. 1 illustrates a process flow diagram of a method for Point-of-interest recommendation.

The illustrative embodiments will be described with reference to the drawings wherein elements and structures are indicated by reference numbers. Further, where an embodiment is a method, steps and elements of the method may be combinable in parallel or sequential execution. As far as they are not contradictory, all embodiments described below can be combined with each other FIG. 1 is a process flow diagram of an exemplary method 100 of Point-of-interest recommendation in accordance with an embodiment. A Point-of-interest is a specific Point-of-interest location that someone may find useful or interesting.

While the embodiments are described with respect to Point-of-interest, those skilled in the art will appreciate that the following embodiments may be used for region-of-interest recommendations, where one or more regions and/or Point-of-interests are provided to the user.

At step 110, the method comprises obtaining one or more Point-of-interests, e.g., museums, restaurants, a beach, etc., for an area, such as a geographical area. The area may be determined based on a location of the user, which may be determined by location detection means. For example, the one or more Point-of-interests may be obtained from a dataset of Point-of-interests comprising the location of a plurality of Point-of-interests. The obtained one or more Point-of-interests may be located in the determined area.

At step 120, the method comprises retrieving Point-of-interest data, e.g., check-in data, for the one or more obtained Point-of-interests. The Point-of-interest data may comprise information about visitors, e.g., visitor information such as demographic data of visitors, associated with the obtained Point-of-interests and information about the obtained Point-of-interests, e.g., Point-of-interest information.

For example, the Point-of-interest data may comprise a check-in dataset, which associates visitor information with Point-of-interest information. The Point-of-interest data may be retrieved from a server or a computer remote to a computing device, e.g., a mobile computing device or a car, on which the method is performed. In an embodiment, the visitor information is associated with a time or a period, such as morning, afternoon, or evening, and the visitor information is only retrieved for a specific time or a specific period at which visitors have visited the obtained one or more Point-of-interests. By retrieving visitor information only for a specific time or a specific period, the data to be processed or transmitted may be reduced.

The visitor information about the visitors may comprise, for each visitor, at least one of: a time, a time window and/or a period the visitor has visited a Point-of-interest, an indication of a characteristic of the visitor, all Point-of-interests of the obtained plurality of Point-of-interests the visitor has visited in a specified period, an indication of at least one of a number of photos the visitor took at a Point-of-interest of the obtained plurality of Point-of-interests, a number of photos the visitor has stored on a mobile device of the visitor, a number of photos the visitor has taken in a specified period, and a number of photos the visitor has posted, an indication of a number of friends of the visitor, an indication of a number the visitor has visited a specific Point-of-interest of the obtained Point-of-interests, an age of the visitor, a gender of the visitor, and an indication of a number of trips of the visitor.

The information about the obtained plurality of Point-of-interests may comprise for each Point-of-interest of the obtained one or more Point-of-interests an indication of at least one of: a rating score, one or more categories, a price range, opening hours, rush hours, a total number of visitors, payment modalities, handicap accessibility, parking availability, an insertion date, and a size of a respective Point-of-interest.

In step 130 of the method 100, a plurality of groups is formed based on the visitor information. The plurality of groups may be formed by employing a frequent itemset mining, FIM, technique, wherein each group is a frequent itemset, and items comprise demographic attributes of the visitors and Point-of-interests associated with the visitors, wherein the demographic attributes are obtained from the visitor information.

By employing an apriori mining algorithm (as described in more detail below) to an online context, method 100 provides an efficient mining of look-alike groups. Look-alike groups are groups in which all members of the group have at least one characteristic in common (e.g., an age range of visitors visiting a specific category of Point-of-interests, a number of friends of visitors visiting a Point-of-interest or a time a visitor had lunch at a restaurant, which can be used to explain, label, or express a group.)

At step 140, one or more groups are determined from the formed plurality of groups based on the Point-of-interest information. For example, the one or more groups may be determined from the plurality of groups by using a mindset function. The mindset function may be selected by the user. For example, the method 100 may comprise receiving a user input of the user, wherein the mindset function is determined based on the user input of the user, and wherein the user input comprises at least one of a selection of a label associated with the mindset function and a selection of a Point-of-interest and/or group previously selected by the user. The mindset function may be determined from a plurality of mindset functions.

Each of the plurality of mindset functions may comprise one or more predefined functions and one or more weights for each function of the one or more predefined functions. Each function of the one or more predefined functions may have one or more input variables obtained from information about one or more Point-of-interests. The weights define how important a function of the plurality of functions is, so that by selecting different weights for different mindsets, each mindset can be used to determine groups with specific characteristics by weighting the same predefined functions differently. The one or more weights may comprise at least one of a predefined weight (also called "prior") and a user-specific weight (also called "weight"). The user-specific weight may be updated in accordance with inputs of the user. The predefined weight may be calculated offline.

The one or more determined groups may maximize an optimization problem. For example, variables of one or more Point-of-interests associated with the one or more groups may maximize the mindset function, wherein the variables are obtained from the information about the obtained plurality of Point-of-interests.

At step 150, one or more Point-of-interests of the obtained plurality of Point-of-interests are provided to the user. The one or more Point-of-interests are associated with the determined one or more groups. For example, the one or more Point-of-interests may comprise a Point-of-interest with the most visitors for each group of the one or more groups. Moreover, the one or more Point-of-interests may be provided in combination with one or more indications of characteristics of the determined one or more groups.

While it is assumed that no data is available for the user (e.g., due to privacy concerns of the user), Point-of-interest recommendations can be obtained by finding look-alike groups in publicly available Point-of-interest datasets. The recommended Point-of-interests may be explainable using their associated groups, e.g., "the group of photoholics tends to visit La Butte in the 18th arrondissment of Paris", and "the group of food lovers tends to visit the restaurant les Apotres de Pigalles, in the same region."

In embodiments, the user can interact with those groups to detect with which group he/she identifies. Based on this interaction, new groups can be mined to align with a user's preferences. This iterative process may ensure that groups and their Point-of-interests reflect interests of a user. Methods according to embodiments discover interests of a user and align recommendations accordingly, without the need of any historical check-in data from the user.

Providing the one or more Point-of-interests to the user may comprise displaying the one or more Point-of-interests to the user, e.g., displaying the one or more Point-of-interests on a display of mobile device of the user or on a display of a car. After the one or more Point-of-interests are provided to the user, the user may select one of the Point-of-interests or perform another interaction with the system, such as selecting a group or a mindset of interest for the user. The System may be associated with the name "LikeMind". An example of how the one or more Point-of-interests may be displayed to the user is illustrated in FIGS. 2 and 3.

Figure 2:
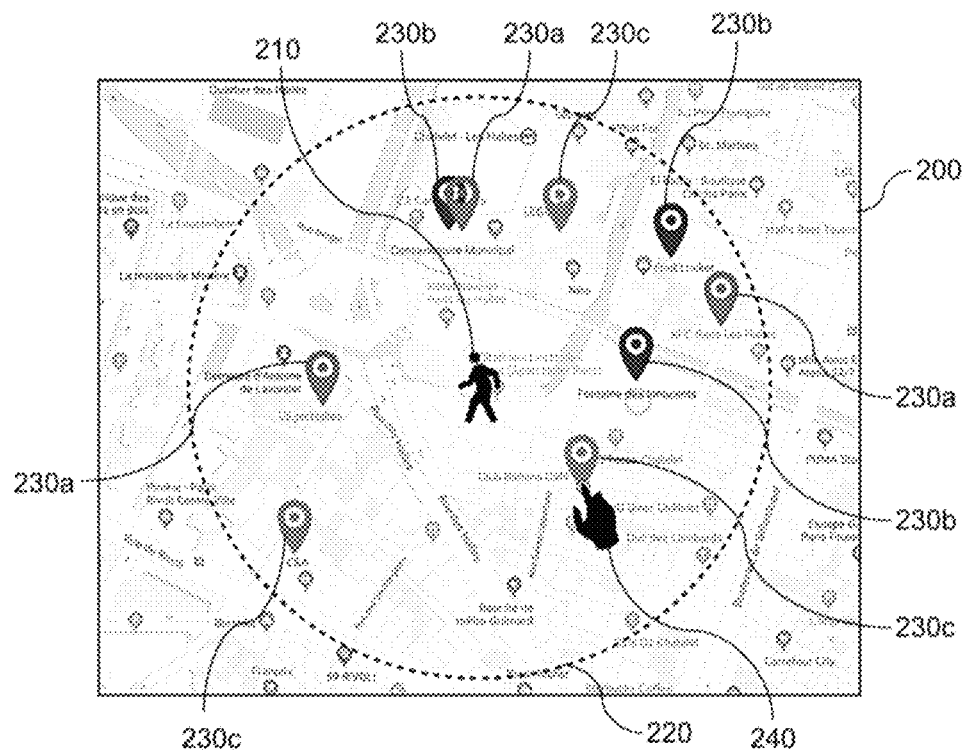
FIGS. 2 and 3 illustrate examples of an application.
Figure 3:
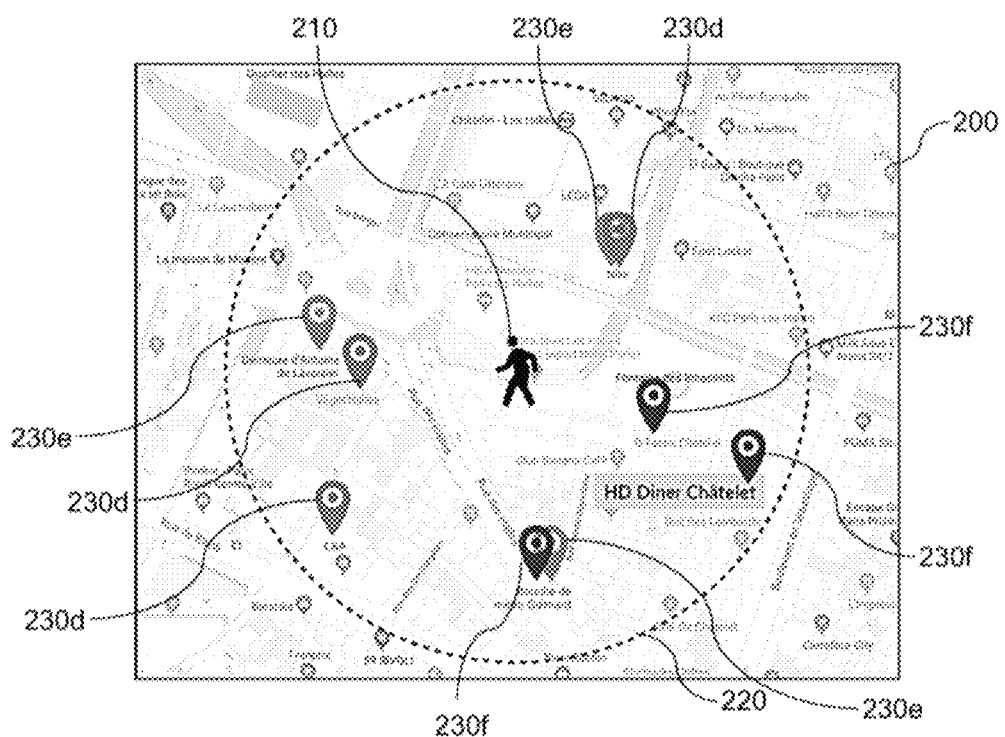

FIGS. 2 and 3 show a map 200 of a part of a city, in this example Paris. In the map 200, a location 210 of the user may be indicated. Further, an area 220 may be depicted in accordance with the location 210 of the user. The area 220 may correspond to a radius around the location of the user. The area may be selected by the user.

For example, the area may be based on a location of the user and a radius specified by the user from the location of the user. Alternatively, the area may be associated with a location selected by a user and/or the area may be specified by predefined values.

FIG. 2 shows a plurality of Point-of-interests 230a, 230b, and 230c, which have been recommended to the user. These Point-of-interests 230a-230c may have been determined in accordance with a method of an embodiment.

The plurality of Point-of-interests 230a-230c may be associated each with a different group. A set of Point-of-interests may be associated with a group, e.g., a group of visitors, wherein the group members have at least one similarity defined by characteristics, features or information of the group members. For example, a set of Point-of-interests 230a may be associated with a first group, e.g., a group of visitors who check-in actively and tend to visit historical landmarks on afternoons, a set of Point-of-interests 230b may be associated with a second group, e.g., a group of visitors who tend to visit Asian food restaurants, and a set of Point-of-interests 230c may be associated with a third group, e.g., a group of visitors who have many friends and tend to visit coffee shops and American restaurants on weekends.

FIG. 2 shows sets of Point-of-interests that are associated with three different groups. Each set of Point-of-interests comprises three Point-of-interests in the example of FIG. 2. However, the number of Point-of-interests in a set of Point-of-interests, as well as the number of sets of Point-of-interests that are associated with respective groups is not limited to three. The number of Point-of-interests in a set of Point-of-interests, as well as the number of sets of Point-of-interests that are associated with respective groups may be predefined or selected by a user.

Each Point-of-interest of a set of Point-of-interests may comprise an indication indicating the group associated with the set of Point-of-interests. For example, the sets of Point-of-interests may be color-coded. The set of Point-of-interests 230a may be displayed in green, the set of Point-of-interests 230b may be displayed in red, and the set of Point-of-interests 230a may be displayed in orange. However, other methods may be used to distinguish the different sets of Point-of-interests. For example, the Point-of-interests may be displayed in a different size or shape, and/or the sets of Point-of-interests may be labeled.

Each Point-of-interest of the sets of Point-of-interests can be selected by a user. Alternatively and or additionally, each set of the sets of Point-of-interests and/or each group associated with a Point-of-interest or a set of Point-of-interests can be selected by a user.

For example, a user may select a Point-of-interest of the set of Point-of-interests 230c. This may comprise clicking a touchscreen of a device to select the Point-of-interest as shown by reference sign 240. However, alternative methods can be used to select a Point-of-interest, such as a voice command or an input on a virtual or physical keyboard.

In response to a selection of a Point-of-interest or a set of Point-of-interests by a user, some or all steps of the method according to FIG. 1 may be performed for a new recommendation of sets of Point-of-interests. The method according to FIG. 1 may be iterated one or more times in response to a user input or interaction for each iteration. Moreover, the user input or interaction may be taken into account for each new recommendation.

FIG. 3 shows a new recommendation of Point-of-interests, namely the sets of Point-of-interests 230d, 230e and 230f, which are displayed to the user, in response to the user selecting a Point-of-interest of the set of Point-of-interests 230c as shown in FIG. 2. Additionally, an indication of the previously selected Point-of-interest 230c may be displayed to the user.

The new recommendation of Point-of-interests as shown in FIG. 3 is a follow-up iteration of a method for recommending Point-of-interests according to an embodiment. The new recommendation of Point-of-interests may be based on the user selection 240 and/or one or more historical user inputs or user interactions.

The sets of Point-of-interests 230d, 230e and 230f may be associated with different groups than the sets of Point-of-interests 230a, 230b and 230c. However, one or more characteristics associated with the groups of FIG. 2 may be the same or similar to characteristics of the groups of FIG. 3.

For example, a set of Point-of-interests 230d may be associated with a first group, e.g., a group of visitors with many check-ins who visit shopping centers, a set of Point-of-interests 230e may be associated with a second group, e.g., a group of visitors who post very few photos and visit Modern Art Museums, and a set of Point-of-interests 230f may be associated with a third group, e.g., a group of visitors who have many friends and visit restaurants on evenings.

Again, each Point-of-interest of the sets of Point-of-interests 230d, 230e and 230f, each set of the sets of Point-of-interests, and/or each group associated with a Point-of-interest or a set of Point-of-interests can be selected by a user. In response to a selection of a Point-of-interest, a group or a set of Point-of-interests by a user, another iteration starts and some or all steps of the method according to FIG. 1 may be performed for a new recommendation of sets of Point-of-interests. Again, the user input or interaction of the last one or more iterations may be taken into account for a new recommendation.

In example 1, a user is called Jane, who is visiting Paris as a tourist. She is walking in the area of the Pompidou center. After thirty minutes of walking, she gets tired and requests "me time" recommendations in accordance with an application of an embodiment, to find Point-of-interests in her vicinity (the area marked by the dashed circle 220 in FIG. 2) within which she can sit and relax. Jane is concerned about privacy and does not share any historical check-in data. In response to her request, three groups, e.g., user groups or visitor groups, related to Jane's intent are outputted, and top-three Point-of-interests for each group, as shown in FIG. 2. She looks at group descriptions, which may additionally be displayed to the user, to see where she finds some doppelgangers in group members. Being a social person, Jane shows interest in the yellow group, i.e., visitors who have many friends, and tend to visit coffee shops and American restaurants on weekends. This motivates her to refine her intent and ask for a place where she can eat in. She interacts with the system and asks where people usually eat in the neighborhood. Hence, the system's multi-shot recommendation system LikeMind (as described in more detail below) returns another three groups to satisfy Jane's intent, as for example shown in FIG. 3. This helps Jane to make up her mind and go to an American-cuisine restaurant called "HD Diner Chatelet".

Accordingly, ambient recommendation (i.e., user and/or location sensitive recommendations) helps users to get actionable Point-of-interest recommendations by interacting with look-alike groups, such as groups of visitors. In an exploratory process a user can refine their ambiguous needs and finalize their decisions. The way users can specify their mindsets (e.g., "me time", "I'm hungry") enables users to enforce their context to the recommendation system and may bias the results towards what they are really interested to receive.

A user $\mu$ may request Point-of-interest-of-Interest (Point-of-interest) recommendations. A user's portfolio of Point-of-interests that the user $\mu$ is interested in may be denoted as $\mathcal{P}_\mu$. In a cold start scenario, where no information about a user's Point-of-interests is present or available, the portfolio does not have any entries ($\mathcal{P}_\mu = \emptyset$). A Point-of-interest dataset $\mathcal{D} = \langle U, \mathcal{P} \rangle$ may comprise a set of visitors U and a set of Point-of-interests $\mathcal{P}$. A set of visitors U may be associated with one or more Point-of-interests or locations.

A visitor may be a human that visits a Point-of-interest. For a visitor $u \in U$, the set u.demogs may contain tuples of the form $\langle d, v \rangle$, where d is a demographic attribute (e.g., age, gender, number of trips, number of check-ins), and $v \in \mathrm{domain}(d)$. Unlike location-based social networks (LBSNs), no user-user matrix needs to be modeled for methods according to embodiments. Users do not need to know each other. The set u.checkins may contain tuples of the form $\langle p, t \rangle$, which represents that u has visited a Point-of-interest $p \in \mathcal{P}$, at time t.

A Point-of-interest $p \in \mathcal{P}$ may be defined as a tuple $p = \langle \mathrm{loc}, \mathrm{att} \rangle$, where p.loc is itself a tuple $\langle \mathrm{lat}, \mathrm{lon} \rangle$ (latitude and longitude, respectively), which defines where p is located geographically. The set p.att is a set of tuples of the form $\langle a, v \rangle$, which denote that the Point-of-interest has the value v for the attribute a, such that $v \in \mathrm{domain}(a)$. Examples of Point-of-interest attributes may comprise a rating score, categories, price range, opening hours, rush hours, total number of check-ins, acceptance of credit cards, handicap accessibility, parking availability, insertion date (the date that the Point-of-interest is added to the database), and a radius or size of the Point-of-interest venue.

Point-of-interests may be rated in accordance with a score. The score of a Point-of-interest may be determined by a function. The score may reflect the interestingness of Point-of-interests. The function may be called utility function in the following. A Point-of-interest utility function $f: 2^\mathcal{P} \rightarrow [0,1]$ may return a value between 0 and 1, which reflects the extent of interestingness for one or several Point-of-interests. Different utility functions can be considered for Point-of-interests, such as utility functions that reflect popularity, surprise, and diversity.

For example, a utility function (popularity(P)) that reflects popularity may comprise a normalized average number of check-ins of P, a utility function (prestige(P)) that reflects prestige may comprise a normalized average rating score of P, a utility function (recency(P)) that reflects recency may comprise an inverse difference between the current date and the average insertion date of P, a utility function (coverage (P)) that reflects coverage may comprise an area of a polygon induced by the geographical location of Point-of-interests in P normalized by the size of the city, a utility function (surprise(P)) that reflects surprise may comprise a normalized Jaccard distance between Point-of-interest categories of P and Point-of-interest categories of the visited Point-of-interests by the user $\mathcal{P}_\mu$, a utility function (category (P, cat)) that reflects a category may comprise a normalized Jaccard similarity between the set category and the categories of P, a utility function (diversity(P)) that reflects diversity may comprise a normalized Jaccard distance between sets of Point-of-interest categories in P, a utility function (size(P)) that reflects size may comprise a normalized average radius of Point-of-interests in P.

Utility functions may be defined as maximization objectives, i.e., a maximized value of those functions is regarded as ideal for the user. Further, utility functions may receive one or more variables associated with one or more Point-of-interests as input.

For instance, given that the "Great Pyramids" of Egypt and the "Notre Dame Cathedral" of France receive 14.7M and 13M annual visitors respectively, and the "Niagara Falls" receives the maximum number of visitors (i.e., 30M), the popularity function, which can be defined as the number of annual visits, provides a score of popularity (Great Pyramids)=0:49, popularity (Notre Dame)=0:43, and popularity (Great Pyramids, Notre Dame)=0:46 (the average of the two). The set of all utility functions is denoted as $\mathcal{F}$.

An exploratory Point-of-interest recommendation setting may be based on "context", which may comprise the current time and location of the user, a Point-of-interest category, Point-of-interest textual description, neighborhood characteristics, and last visited Point-of-interest or Point-of-interests of a user.

In an embodiment, only the current time and location are used denoted as a tuple $c_\mu = \langle$ loc, time$\rangle$ for a given user $\mu$. For more generality, $c_\mu$.time may represent a categorized variable, with the following values: "morning" (5:00 to 11:00), "afternoon" (12:00 to 17:00), "evening" (18:00 to 22:00), and "night" (23:00 to 4:00).

An additional dimension of contextuality is a "mindset", i.e., actual situation, emotion, and intents of the user. Mindsets should reflect the way interestingness of Point-of-interests are computed based on user's interests.

While online services such as "AroundMe" enable users to explore their nearby region by selecting explicit Point-of-interest categories (e.g., museums, historical landmarks), mindsets capture implicit intents of users (e.g., "let's learn") which are more challenging to capture.

TABLE 1

| Mindset label | Description |
| --- | --- |
| m1: I'm new here | towards touristic Point-of-interests about the popular attractions in the city |
| m2: surprise me | towards Point-of-interests which haven't been visited before by the user and are uncommon (seldom visited) |
| m3: let's workout | towards Point-of-interests related to physical exercises like swimming pools, parks, gyms, and mountains |
| m4: me time | towards Point-of-interests related to activities to treat oneself and and have solo time to unwind and relax |
| m5: I'm hungry | towards getting faster access to food-related Point-of-interests nearby |
| m6: let's learn | towards Point-of-interests such as museums, libraries and cultural landmarks |
| m7: hidden gems | towards small intriguing local Point-of-interests that are highly rated but not necessarily popular |

A mindset m is a tuple m=⟨label, func( )⟩$\mathcal{P}_\mu$, where label provides a short description of the mindset, and func( ) defines semantics of Point-of-interest interestingness. For instance, in case m.label="I'm hungry", m.func( ) is formulated in a way to increase the interestingness of restaurants and coffee shops. Also in case m.label="let's learn", m.func ( ) biases museums, libraries and cultural landmarks.

Selecting a mindset may be helpful in finding Point-of-interests in a fast manner. Further, a mindset may allow finding Point-of-interests when a user does not have a precise need. A mindset may be described by a label. Examples of mindsets are listed in Table 1.

Given a mindset m, the function m.func( ) is defined as follows:

$$m \cdot func(P, \mu) = \frac{\sum_{f_i(P) \in F} \omega_{i,\mu} b_{i,m} f_i(P)}{\sum_{f_i(P) \in F} \omega_{i,\mu} b_{i,m}} \quad \#(1)$$

In Equation 1, $f_i(P)$ is a utility function, and $\omega_{i,\mu}$ and $b_{i,m}$ are weights of $f_i(P)$ for the mindset m, where $\omega_{i,\mu}$ may also be called a first weight, simply weight or a user-specific weight and $b_{i,m}$ may be called a second weight or a prior in the following. Priors reflect the importance of a utility function for a mindset. In case $b_{i,m}=0$, $f_i(P)$ has no influence on the mindset m.

On the other hand, in case $b_{i,m}=1$, the mindset m is defined only based on $f_i$. User-specific weights reflect the importance of a utility function for a user. For example, a user may have more interest in popularity than coverage. The weights are assumed to shape up when the user interacts with the system. Given the set of all possible user-specific weights W, initially $\forall w \in W, w=1.0$. While weights are dynamic and change per user, priors can be learned offline and may stay unchanged at the online execution. The combination of weights and priors result in posteriors for utility functions.

TABLE 2

| Mindset | Popularity | Prestige | Recency | Coverage | Surprise | Category | Diversity | Size |
| --- | --- | --- | --- | --- | --- | --- | --- | --- |
| m1 | 0.25 | 0.25 | 0.10 | 0.15 | 0.00 | 0.00 | 0.25 | 0.00 |
| m2 | 0.20 | 0.20 | 0.00 | 0.10 | 0.00 | 0.40 | 0.10 | 0.00 |
| m3 | 0.20 | 0.20 | 0.00 | 0.10 | 0.00 | 0.50 | 0.00 | 0.00 |
| m4 | 0.10 | 0.10 | 0.00 | 0.10 | 0.00 | 0.40 | 0.00 | 0.30 |

TABLE 2-continued

| Mindset | Popularity | Prestige | Recency | Coverage | Surprise | Category | Diversity | Size |
|---|---|---|---|---|---|---|---|---|
| m5 | 0.00 | 0.30 | 0.10 | 0.30 | 0.00 | 0.30 | 0.00 | 0.00 |
| m6 | 0.25 | 0.20 | 0.00 | 0.00 | 0.25 | 0.00 | 0.20 | 0.10 |
| m7 | 0.30 | 0.30 | 0.15 | 0.00 | 0.00 | 0.00 | 0.00 | 0.25 |

Table 2 shows priors in mindsets with the largest values of prior for each mindset shown in bold.

Table 2 shows an example of utility function priors in mindsets. For instance, the mindset m2 (i.e., "surprise me") is a combination of following utility functions in decreasing order of their prior value: surprise, popularity, prestige, diversity, and size.

For the "category" function, Point-of-interest categories need to be specified. Table 3 shows examples of specific categories for each mindset. As shown in Table 2, m1, m6 and m7 may not be related to the category function, since their prior is 0. Accordingly, for these mindsets no categories need to be specified.

TABLE 3

| Mindset | Categories of interest |
|---|---|
| m2: surprise me | entertainment, art, gallery, sculpture, zoo, bookstore |
| m3: let's workout | sport fields, park, health and fitness, bowling, tennis court, ice skating |
| m4: me time | outdoor, food, tea room, bar, coffee shop |
| m5: I'm hungry | restaurants, grocery stores, convenience stores, fast food |

Mindsets can be independent entities or may be combined with each other. For example, an intent of a user may be captured with a combination of two or more mindsets. Mindsets may be combined directly by selecting multiple mindsets by a user.

Alternatively or additionally, mindsets may be combined in an indirect manner by selecting different mindsets in different iterations, wherein each result of one iteration affects the result of the subsequent result of the subsequent iteration. By selecting different mindsets during multiple iterations of the method for Point-of-interest recommendation, results of subsequent iterations may be influenced by previous selections of results by a user.

Groups, such as visitor groups or user groups, may be formed based on a dataset/data, such as a Point-of-interest dataset/Point-of-interest data. This dataset may be generated by collecting data or by obtaining the dataset from an external source or a remote server. For example, publicly available Point-of-interest datasets from a third party, such as Yelp, TripAdvisor, Foursquare, and Gowalla, may be used to form groups.

The Dataset may comprise information about visitors and information about Point-of-interests and/or may be structured as $D=\langle U, P \rangle$. To build look-alike relations in a dataset, such as a publicly available Point-of-interest dataset, "visitor groups" may be formed or built by aggregating a set of visitors with common demographics, characteristics and/or Point-of-interests.

Visitor groups may be virtual and group members do not necessarily know each other. In other words, members of a group are "location friends" (who have checked in the same places) and not "social friends" (who are socially connected like in an LBSN). A visitor group may be a triple g=(members, demogs, POIs) where g.members⊆U, and "demogs" and "Point-of-interests" may comprise the following expression-based conditions that those members may satisfy:

(i) $\forall u \in g.members, \forall (a, v) \in g.demogs, (a, v) \in u.demogs$
(ii) $\forall u \in g.members, \forall p \in g.POIs, \exists (p, t) \in u.checkins$.

The "relevance" between a visitor group and a user $\mu$ regarding $P_\mu$ may be defined by a Boolean function $rel(g, P_\mu)$, where a result of 1 may be regarded as "relevant" and a result of 0 may be regarded as "irrelevant". This may be computed as follows.

$$rel(g, P_\mu) = \begin{cases} 0 & P_\mu \neq \emptyset \lor P_\mu \cap g \cdot POIs \neq \emptyset \\ 1 & \text{otherwise} \end{cases} \quad \#(2)$$

Intuitively, a group g may be relevant to a user u when there is at least one Point-of-interest in common between the user u and the group g. In case $P=\emptyset$ (i.e., cold start), g may be regarded as relevant whatsoever.

In embodiments, given a user $\mu$ and his/her affiliated context $c_\mu = \langle loc, time \rangle$, a mindset $m = \langle label, func \rangle$, a radius r, and integers k and k', the problem is to find k groups G and k' Point-of-interests for each group in G, such that the following conditions are met.

(a) $\forall g \in G, g, rel(g, P_\mu)=1$;
(b) $\forall g \in G, \forall p \in g.POIs, distance(p.loc, c_\mu.loc) \leq r$;
(c) $\forall g \in G, \forall p \in g.POIs, \forall u \in g.members, \forall \langle p, t \rangle \in u.$ checkins, $t=c_\mu.time$; and
(d) $\Sigma_{g \in G}(m.func(g.POIs, \mu))$ is maximized.

The first three conditions ensure that groups are relevant to the user, in vicinity of the user's location, and in the same time category of the user's context. The last condition applies the input mindset to groups, and verifies whether groups' Point-of-interests are maximally in line with the mindset. The problem of determining k groups by maximizing an optimization objective for ambient recommendation using look-alike groups, comprises (i) relevance and distance constraints, and (ii) maximization of more than one objective (as mindset functions combine several utility functions as objectives).

Ambient recommendation using look-alike groups is also challenging in practice, because the potential number of relevant groups is huge. A brute-force scan over the group space makes the maximization of the mindset function extremely time-consuming.

In an embodiment, a method and a system for ambient recommendation of Point-of-interests using look-alike groups is a session-based method and system, which begins with an ambiguous user's intent for Point-of-interest recommendation, and ends when the user is satisfied with the resulting Point-of-interests. The method and the system for ambient recommendation of Point-of-interests may be called "LikeMind" in the following parts of the description. Each session may consist of a finite sequence of iterations, which may comprise capturing interactions with the user. A new iteration may begin by defining a mindset or selecting a mindset function (which may remain the same as in the previous iteration). At the end of each iteration, k relevant groups and/or k' Point-of-interests for each group are provided to the user.

Figure 4:
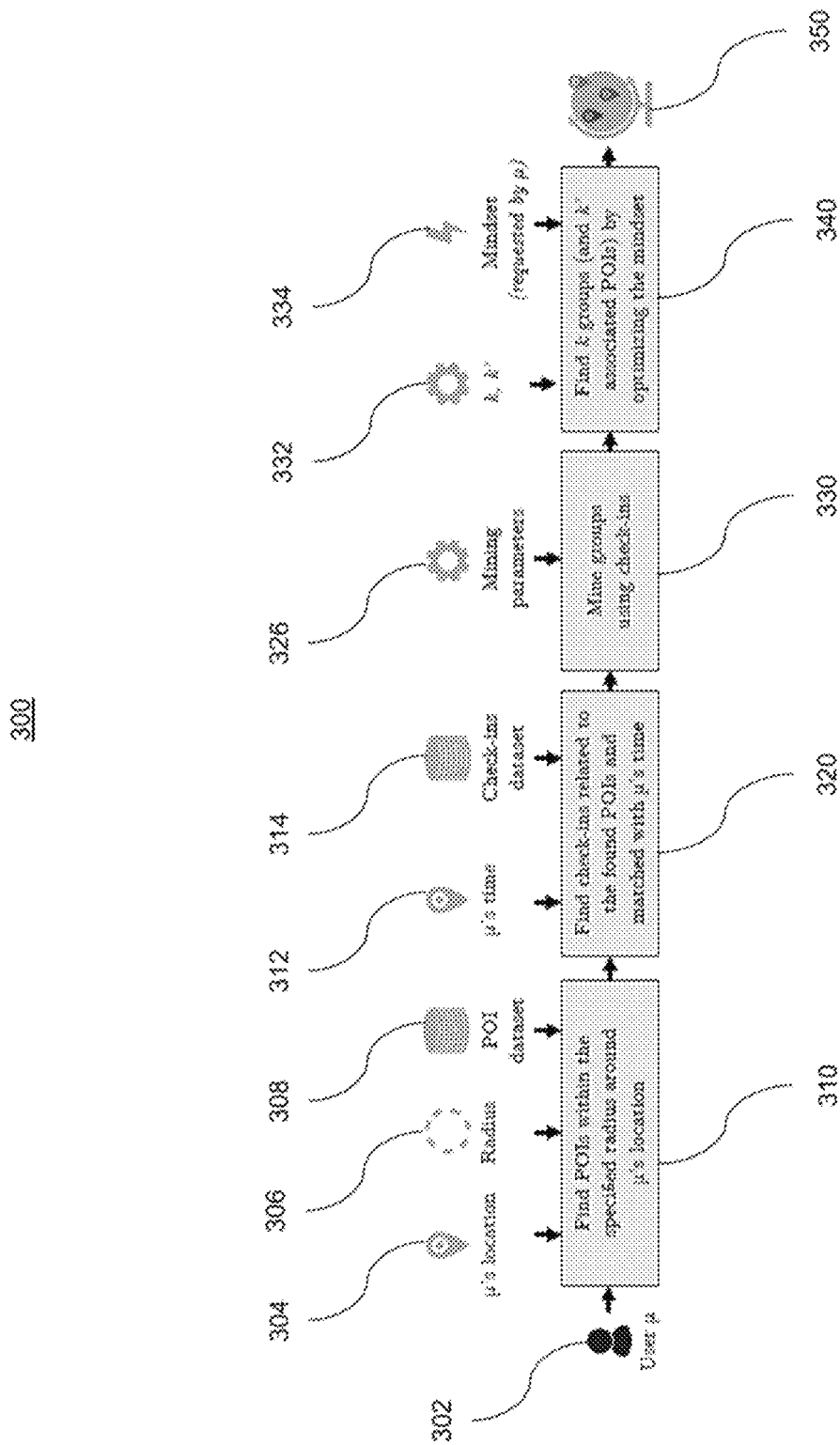
FIG. 4 illustrates a process flow diagram of a method for Point-of-interest recommendation.

FIG. 4 illustrates a process flow diagram of a method 300 for Point-of-interest recommendation in accordance with an embodiment. Specifically, method 300 may be an iterative method, which can be repeated based on a user input of a user 302.

For example, at the end of each iteration, the user is free to bookmark some of the recommended Point-of-interests as his/her favorites. Accordingly, two types of feedback may be provided to the system by the user, firstly, the mindset (which may stay unchanged between consecutive iterations) and Point-of-interest bookmarks. This multi-shot architecture contradicts most traditional single-shot Point-of-interest recommendation approaches, by incorporating user interactions in the recommendation. Steps of the method 300 of FIG. 4 may be combined with steps of the method 100 of FIG. 1.

| Algorithm 1 | |
|---|---|
| Input: | Visitors U and Point-of-interests $\mathcal{P}$, user context $c_\mu$ = <loc, time>, radius r, mindset m, number of groups k, number of Point-of-interests per group k' |
| Output: | Groups G and their Point-of-interests $P_G$ |
| 1. P ← nearby_POIs($\mathcal{P}$, $c_\mu \cdot$ loc, r) | |
| 2. H ← checkins_of(P, $c_\mu \cdot$ time) | |
| 3. G* ← mine_groups(U, H) | |
| 4. G ← maximize(u, G*, k, m) | |
| 5. for each group g ∈ G do $P_G \cdot$ append(top_POIs(g, k')) | |
| 6. return G, $P_G$ | |

At each iteration, the system may return or provide groups and Point-of-interests from a Point-of-interest dataset (addressing the cold start challenge) based on the functionality of a selected mindset. Algorithm 1 describes the process.

In step 310, the method and system finds all nearby Point-of-interests, which are within an area or a radius 306 associated with the user. For example, the method and system finds all nearby Point-of-interests, which are at most r kilometers/miles far from the user (line 1), where r may be a user-defined or predefined input parameter. The parameter r ensures that recommendations relate to a user's location 304 or a location selected by a user. The Point-of-interests may be retrieved from a dataset 308 comprising information about the Point-of-interests.

In an example, an implementation of ST_DWithin function in PostGIS (the spatial database extension for PostgreSQL relational database) is employed to achieve a near real-time retrieval of Point-of-interests. The set of nearby Point-of-interests as nearby P⊆$\mathcal{P}$.

In step 320, check-in information related to the found Point-of-interests may be obtained and matched with a time 312 associated with the user 302. This time may correspond to a current time or a time selected by the user. Check-in information may comprise information about visitors that have visited a Point-of-interest.

Based on the nearby Point-of-interests P, information, such as check-in information, of these nearby Point-of-interests may be retrieved (line 2) from a dataset 314. The dataset 308 and dataset 314 may be stored in the same data storage or in different/distributed data storages. A check-in $\langle p, t \rangle$ may be comprised in the set of all nearby check-ins H, when a Point-of-interest is comprised in the set of nearby Point-of-interests p∈P and a time associated with the user matches with a time of the check-in $t=c_\mu$.time or falls within a certain period associated with the check-in.

For example, the time condition may convey that the check-in and the user context should belong to the same time category, e.g., "morning". The set H may function as a join table between Point-of-interests and visitors. Hence, visitors can be found that checked in nearby Point-of-interests using check-in information.

In step 330, groups G* among checked-in visitors (line 3) are mined. The groups G* may be mined or determined based on one or more parameters 326. The one or more parameters 326 may be set by the user 302.

In step 340, one or more groups G, e.g., groups of visitors, are determined or found in the groups G*. The set of groups G is a subset of groups G*. The number of found groups is denoted as k and may be defined or selected by a user or may be predefined.

Specifically, step 340 may comprise determining k groups G that collectively maximizes the mindset function (line 4). The group set G may be aligned to the user's intent expressed in the mindset. Finally, a number k' of Point-of-interests corresponding to the groups G are selected. For example, the top-k' Point-of-interests for each group, which are visited by most of the group members, may be selected (line 5).

In step 350, the k' Point-of-interests and/or the k groups G are provided to the user 302. At this stage, the user may observe k groups and k' Point-of-interests for each group G for selection to bookmark Point-of-interests for enriching his or her portfolio.

The groups may be mined in a manner so that the groups are described by one or more characteristics of the visitors associated with a group. In an embodiment, Frequent Itemset Mining (FIM) technique is employed to find/mine groups, where each group is a frequent itemset, and items are common demographic attributes and POIs of group members or visitors. While groups can be discovered in myriad ways, in an embodiment FIM is employed to obtain describable groups with overlaps, so that visitors can be a member of more than one group and be described in different ways. By providing describable groups, the user may easily see why certain POIs are provided and, thus, receives an explanation why certain POIs are provided to the user.

For each visitor u∈U, a transaction trans(u) may be build, which contains all demographic attributes and visited POIs of u. The set τ comprises transactions of all visitors, i.e., τ={trans(u)|u∈U}. Given an arbitrarily group of visitors g=⟨members, demogs, POIs⟩, a group support supp(g) may be defined as a measure of g's significance (Equation 3).

$$\text{supp}(g)=|\{u \in U | \text{trans}(u) \in \tau, g.\text{demogs} \cup g.\text{POIs} \subseteq \text{trans}(u)\}| \quad \#(3)$$

The group g is a frequent itemset (and hence a valid group), if supp(g) is larger than a predefined support threshold. The support threshold may be a user-defined parameter.

Transactions may be sets of items encoded as integers. Hence, all Point-of-interests and demographic values may be encoded to single integers. While Point-of-interests are often already associated to a unique identifier that can be directly used in transactions, demographic attributes may have different values in discrete or continuous domains. For instance, the demographic attribute "number of check-ins" may contain different values in a wide range.

An equal-frequency discretization approach may be employed to obtain a specific number of categories, e.g., 4, for each demographic attribute. For example, the categories may be "very few", "few", "some", and "many". Equal-frequency discretization determines the minimum and maximum values of each attribute, sorts all values in ascending order, and divides the range into a pre-defined number of intervals, in such a way that every interval contains the equal number of sorted values.

TABLE 5

|  | Very few | Few | Some | Many |
|---|---|---|---|---|
| Items | ≤2 | (2,3] | (3,5] | ≥5 |
| Photos | ≤1 | (1,2] | (2,5] | ≥5 |
| Pins | ≤1 | (1,3] | (3,6] | ≥6 |
| Friends | ≤1 | (1,3] | (3,5] | ≥5 |
| Stamps | ≤3 | (3,9] | (9,23] | ≥23 |
| Check-ins | ≤3 | (3,12] | (12,34] | ≥34 |
| Places | ≤3 | (3,9] | (9,23] | ≥23 |

Table 5 illustrates example discretization values for demographic attributes in a dataset. The discretized attributes result in 28 items (7 attributes and 4 categories for each) to be inserted in transactions. For instance, a visitor transaction may contain items "many places" and "few photos", which means that the visitor went to many places, but did not take many pictures.

Beyond demographics and visited Point-of-interests, transactions may comprise Point-of-interest categories and a check-in time. This ensures that transactions are richer and groups will be more informative. For a Point-of-interest p in a transaction of a visitor u, p.att may be concatenated with trans(u). For instance, if Louvre∈trans(u), the category, e.g., ⟨cat, museum⟩, may be an additional item in trans(u). This enables the system to generate a group of visitors who check in museums in general, but not necessarily Louvre. For instance, in FIG. 2, the visitors of the group 230a may all have checked in a "historical landmark", but it could be different landmarks that they checked in.

Additionally, for a pair of Point-of-interest and visit time ⟨p, t⟩∈u.checkins, t may be discretized to hourly and weekly categories and trans(u) may be concatenated with those hourly and weekly categories alongside p's category. For instance in FIG. 2, members of the group 230a may all have checked in a restaurant (any Point-of-interest with the category "restaurant") in the evening.

Given the set of transactions τ, an apriori mining algorithm may be employed to mine groups. The input of the apriori mining algorithm is of type ARFF (Attribute-Relation File Format) which contains the set of all enriched transactions. The apriori mining algorithm may be inefficient for large number of transactions, as its execution time grows exponentially with the number of transactions. In conventional systems, these calculations may be performed in an offline step preceding an online investigation on groups. In embodiments, the mining process may be performed on-the-fly, because of the neighborhood filters preceding the apriori mining algorithm. In other words, the apriori mining algorithm mines groups only for visitors with check-ins in the vicinity of the user. Hence, the size of the visitor set is drastically reduced compared to the number of all users.

Each mindset is associated to a function, which may be a set of utility functions combined in a linear fashion with user-specific weights and priors (Equation 1). The mindset function admits as input variables associated with a set of Point-of-interests, and returns a value in the range [0, 1]. Given a mindset m and a group g, the utility of g regarding m's functionality may be measured as follows:

$$\text{group}_{utility(g)} = m.\text{func}(g.\text{POIs}) \quad \#(4)$$

Given the space of all group utility values, the problem is to find k groups with the largest values of group utility. As each mindset function is constructed as a combination of several utility functions, maximizing mindset functions is a multi-objective optimization problem. However, a scalarization approach may be employed using user-specific weights and priors to reduce the complexity of the problem to single-objective optimization. In an embodiment, a multi-objective optimization approach is employed to obtain groups. In an embodiment, a greedy-style algorithm may be employed to maximize mindset functions (Algorithm 2).

| Algorithm 2 |
|---|
| Input: User μ, mined groups G*, mindset m, number of returned groups k, time limit tl |
| Output: Groups G s.t. \|G\| = k |
| 1. for g ∈G* do |
| 2.   if rel(g, P_μ) = 0 then G* ← G* \ {g} |
| 3. end |
| 4. sort(G*, supp, descending) |
| 5. G ← pick(G*, k) |
| 6. g_out ← pick(G*, 1) |
| 7. while tl is not exceeded do |
| 8.   for g_in ∈ G do |
| 9.     G' ← G ∪ g_out \ g_in |
| 10.     if Σ_{g'∈G'} m · func(g') > Σ_{g∈G} m · func(g) then |
| 11.       G ← G' |
| 12.       break |
| 13.     end |
| 14.   end |
| 15.   g_out ← pick(G*, 1) |
| 16. end |
| 17. return G |

The algorithm starts by removing all irrelevant groups to the user (line 2). This ensures that groups are in line with preferences of the user provided in previous interactions. Users can describe their preferences by "bookmarking" recommended Point-of-interests. These bookmarked Point-of-interests will enrich the user's portfolio, which contributes to identifying irrelevant groups to user's preferences. Once the user clicks on a Point-of-interest p, it will be added to $P_\mu$. Then the relevance of a group g regarding $P_\mu$, i.e., rel (g, $P_\mu$) may be computed as in Equation 2.

After pruning irrelevant groups, the algorithm iterates over the space of groups to maximize the mindset function. At each step, the algorithm introduces a new group to the set of k groups, and verifies if the value of the mindset function increases. In case of improvement, the new group will become a member of the k groups, and another group will be selected for a substitution. The improvement loop breaks when a time limit tl exceeds. While the time limit tl should normally be a user-defined input parameter, in embodiments, the time limit is fixed to the time of "continuity preserving latency", i.e., tl=100 ms, which is the limit for humans to have an instantaneous experience of the interactive process.

The function pick( ) (lines 5 and 6) may employ different semantics to enforce the "scanning order" in the space of groups G*. The semantics may be designed in a way to boost the optimization process by moving faster towards the optimized value. Mindsets are combinations of different optimization objectives. The "support" measure (Equation 3) may be employed to enforce order; hence larger groups have higher chances to be selected. Larger groups contain more visitors and provide richer insights. Hence, the function pick(G*, k) returns top-k unseen groups in G* with the largest support.

Recommendations become more personalized with each interaction of the user with the method and system, since weights in mindset functions may be updated according to user's interactions. Given a user µ and a mindset m, the weight of a function $f_i$ in m.func( ) is calculated as follows.

$$w_{i,\mu} = \begin{cases} f_i(P_\mu) & P_\mu \neq \emptyset \\ 1 & \text{otherwise} \end{cases} \quad \#(5)$$

In case µ as already performed some interactions with the system (i.e., $P_\mu \neq \emptyset$), the value of $w_{i,\mu}$ is set relative to the orientation of µ's previous choices towards $f_i$. It reflects the importance of a utility measure for the user µ. In case no interaction is available, the weight is set to 1.0. For instance, in case $f_i$=coverage, and P contains Point-of-interests only from one single neighborhood of the city, $w_{i,\mu}$ may comprise a value close to zero. Intuitively, it shows that there is less importance in µ's subjective preference for maximizing coverage.

It is noted that $P_\mu$ affects the method according to embodiments in two different levels of granularity, group and mindset levels. In group level, it enables the system to have an early pruning on groups with no Point-of-interest overlap with $P_\mu$ (line 2 of Algorithm 2). In mindset level, it aligns user-specific weights of utility functions to user preferences in $P_\mu$.

For experiments in accordance with embodiments, the Gowalla dataset [27, 41] has been used, collected from a popular LBSN with 36.001.959 check-ins of 319.063 visitors over 2.844.076 POIs in the period of November 2010 to December 2011. The Gowalla dataset is used as a proof of concept. The timeliness of a Point-of-interest dataset is of importance. Gowalla's check-in matrix density is $2.9 \times 10^{-5}$. POIs are grouped in 7 different categories, i.e., community, entertainment, food, nightlife, outdoors, shopping, and travel. Each category comprises several sub-categories. For instance, "park" is a sub-category of "outdoors". Gowalla is among the few Point-of-interest datasets that provide attributes for both, visitors and Point-of-interests. Hence, groups can be formed comprising both demographic attributes and Point-of-interests. This increases the explainability of groups, and enables users to find out with which group they identify. Visitor attributes are illustrated in Table 4. Point-of-interests are described using the following attributes: insertion date, location, total number of check-ins, radius (in meters), and categories. The experiments in accordance with embodiments validate the efficiency and effectiveness of the invention. In the following parts of the description, methods and systems according to embodiments will be called "LikeMind".

Unlike one-shot recommendation algorithms, an exploratory system like LikeMind incorporates end-users in the loop. As will be shown, the multi-shot recommendation system LikeMind is fast enough to enable realistic interactions with the user. Moreover, the efficiency of the system is examined by measuring the execution time at each iteration.

The overall behavior of LikeMind is examined in tackling the cold-start problem, and providing customizability, contextuality, and explainability in Point-of-interest recommendation. To remove the influence of human decisions from the exploratory process of LikeMind, interactions are simulated in the Gowalla dataset and the Hit Ratio (HR) for each simulated session analyzed. HR is a widely used metric for evaluating recommendation algorithms.

Specifically, 100 different sessions have been simulated and a HR as the average over all the sessions is reported. In each session, first a user is randomly picked from the Gowalla dataset. From the set µ.checkins, a check-in $\langle p, t \rangle$ is randomly picked, and the user's context is set as $c_\mu = \langle p.\text{loc}, t \rangle$. A set $\zeta_\mu \subseteq \mu.\text{checkins}$ is built as follows.

$$\zeta_\mu = \{\langle p,t \rangle \in \mu.\text{checkins} | 0 < \text{distance}(p.\text{loc}, c_\mu.\text{loc}) \leq r \wedge |t - c_\mu.\text{time}| \leq 48\} \quad \#(6)$$

The set $\zeta_\mu$ comprises nearby Point-of-interests (constrained using the radius r) that the user µ visited in the next two days after his/her current context time $c_\mu.\text{time}$. In this experiment, r is set to 0.5 km. LikeMind contributes to the HR if its output overlaps with $\zeta_\mu$. To simulate the cold-start environment, the whole set µ.checkins is masked off as testing set.

Each session contains N consecutive iterations. Each iteration is fired by simulating the action of picking a mindset m. LikeMind will then generate groups and their Point-of-interests using m and $c_\mu$. The iteration ends by simulating the action of picking a group of interest g* and a Point-of-interest of interest p* associated with g*. The Point-of-interest p* will be added to $\mathcal{P}_\mu$.

Two baselines for group selection are investigated: (i) a group is randomly picked; (ii) a group g* is picked, where Cosine(g*.demogs, µ.demogs) is maximal. The latter is called the optimal group strategy. Moreover, two baselines are investigated for mindset selection: (i) one of the mindsets m1 to m7 (see Table 1) is randomly selected; and (ii) the mindset m with the highest value of m.func( ) for the Point-of-interests of g* in the previous iteration is selected. The latter is called the optimal mindset strategy. For a more realistic simulation of the mindset selection process, the fact that users do not always switch to a new mindset in each iteration is considered.

Hence, a parameter θ, which is the probability that the mindset in the next iteration will stay unchanged is defined. For instance, in the case θ=0.8, it is highly probable that the mindset does not change between consecutive iterations. By default, a random strategy is employed for both group and mindset selection, and θ=0.5.

A HR is determined at two different levels of granularity, iteration level and session level. At the iteration level, the measure is denoted as $HR_I@N$, and is computed as the average HR obtained at each iteration in a session.

$$HR_I@N = \frac{\sum_{i=1}^{S} \frac{\sum_{j=1}^{N} \mathbb{1}(i, j, \mu)}{N}}{S} \quad \#(7)$$

In Equation 7, N is the number of iterations, S is the number of sessions (S=100), and $\mathbb{1}(i, j, \mu)$ is an iteration-based hit indicator function which returns "1" if there is a hit (Point-of-interest in common with $\zeta_\mu$) at iteration j of the session i. At the session level, the measure is denoted as $HR_S@N$, and is computed as the average HR for the whole session, as the result of all interactions in N iterations.

$$HR_S@N = \frac{\sum_{i=1}^{S} \mathbb{1}_{j=1}^{N}(i, j, \mu)}{S} \quad \#(8)$$

In Equation 8, $\mathbb{1}(i, j, \mu)$ is a session-based hit indicator function which returns "1" if there is at least one hit in the iterations j of the whole session i. Obviously, session level HR subsumes the iteration level one.

Figure 5:
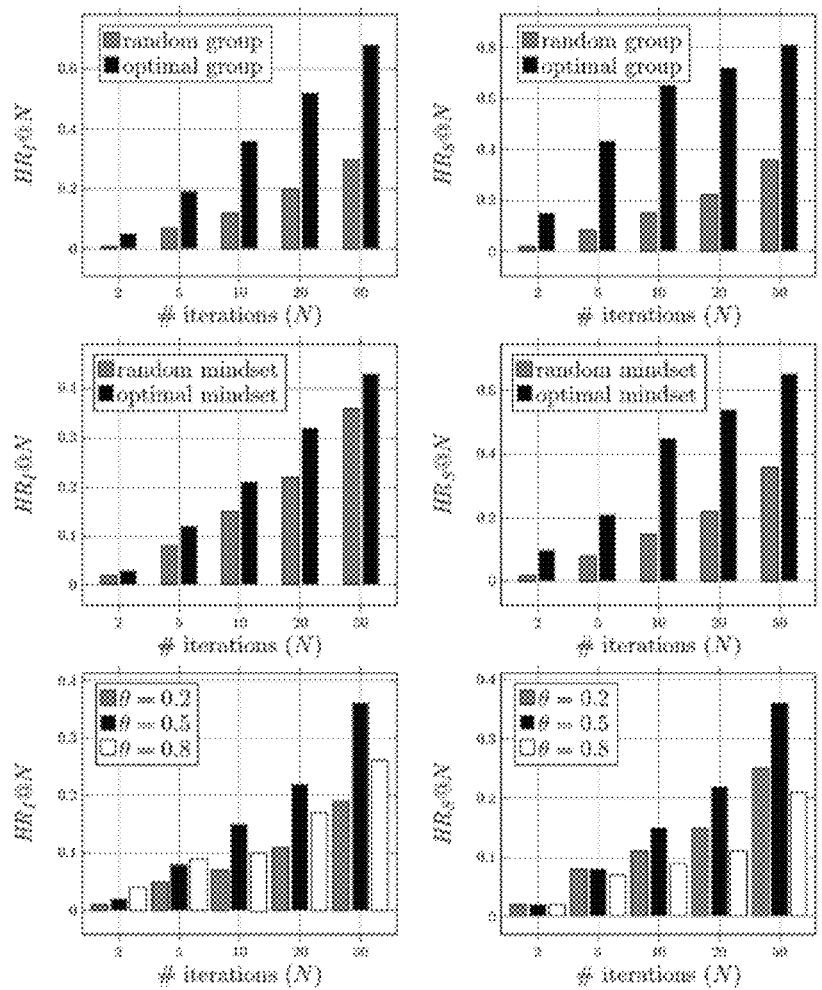
FIG. 5 shows histograms of experiments.

FIG. 5 illustrates HR values using different strategies of group selection, mindset selection, and mindset change. The HR is measured by varying N (number of iterations) from 2 to 50. The bar graphs on the left of FIG. 5 report an iteration level HR, and the ones on the right report session level HR.

Regarding the strategy of group selection, optimal groups increase the HR by 22% and 38.8% on average, in iteration and session levels, respectively (top row in FIG. 5). In session level, the HR grows to values larger than 50% after only 10 iterations, and it reaches to 82% at 50 iterations. Accordingly, look-alike groups function as a good proxy to gain user preferences.

Regarding the mindset selection strategy, the optimal mindsets increase the HR by 22.4% in session level (middle row in FIG. 5). However, the increase in iteration level is not salient. This shows that in contrary to group selection strategies, mindset selection has a long-term influence on the overall session. In session level, the HR grows to values close to 50% after 10 iterations, and it reaches to 65% at 50 iterations.

Moreover, the effect of changing mindsets between consecutive iterations has been investigated. Three different values for the parameter $\theta$, namely $\theta=0.2$, $\theta=0.5$ and $\theta=0.8$. The larger values of $\theta$ increase the probability that mindsets stay unchanged between consecutive iterations. Bottom row in FIG. 5 shows the results. Both extremely low and high values of $\theta$ provide lower values of HR compared to the case of $\theta=0.5$. The effect is even amplified in more iterations. Accordingly, the optimal strategy for changing mindsets is a mixed strategy, i.e., the mindsets do not necessarily change at each iteration, but there is an equal chance that the previous mindset is employed again.

In this experiment, the efficiency of LikeMind has been investigated by measuring the average execution time at each iteration. The radius r and the number of groups k are the two most influencing input parameters on the performance of LikeMind. Hence, the execution time is reported by varying r between 50 m and 1 km, and k between 5 and 70. The k' parameter is not specifically analyzed, since it is a dependent variable to k. All the performance experiments are conducted on an 2.2 GHz Intel Core i7 with 32 GB of DDR4 memory on OS X 10.14.6 operating system.

To dissect LikeMind's performance, the execution time is reported for each of the following stages of Algorithm 1:
a. stage 1: finding nearby Point-of-interests (nearby_POIs( ) function in line 1 of algorithm 1),
b. stage 2: finding check-ins of the nearby Point-of-interests (checkins_of ( ) function in line 2 of algorithm 1),
c. stage 3: building the transaction matrix and generating look-alike groups (mine_groups( ) function in line 3 of algorithm 1), and
d. stage 4: finding k optimal groups and their k' associated Point-of-interests regarding a given mindset (maximize( ) function in line 4 of algorithm 1).

The average execution time over 100 iterations is reported. Each iteration is simulated as described in the section "simulation study." By default, parameters have been set to k=k'=5, and r=0.5 km.

Figure 6:
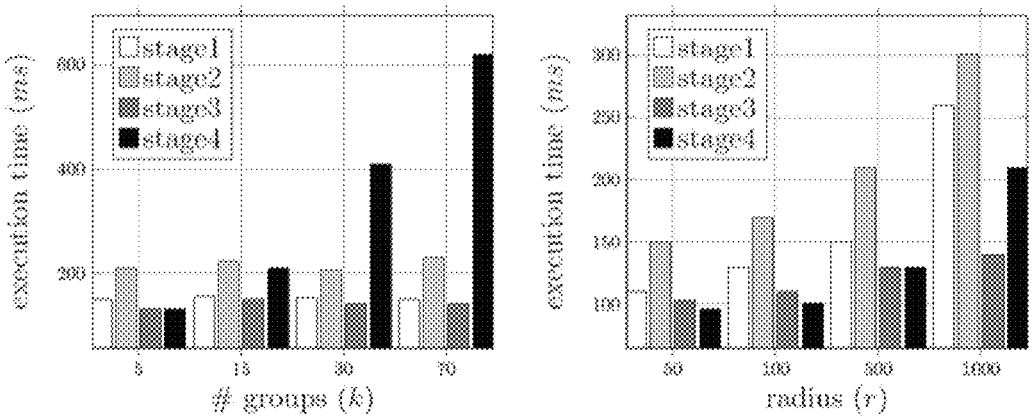
FIG. 6 shows histograms of experiments.
Figure 7:
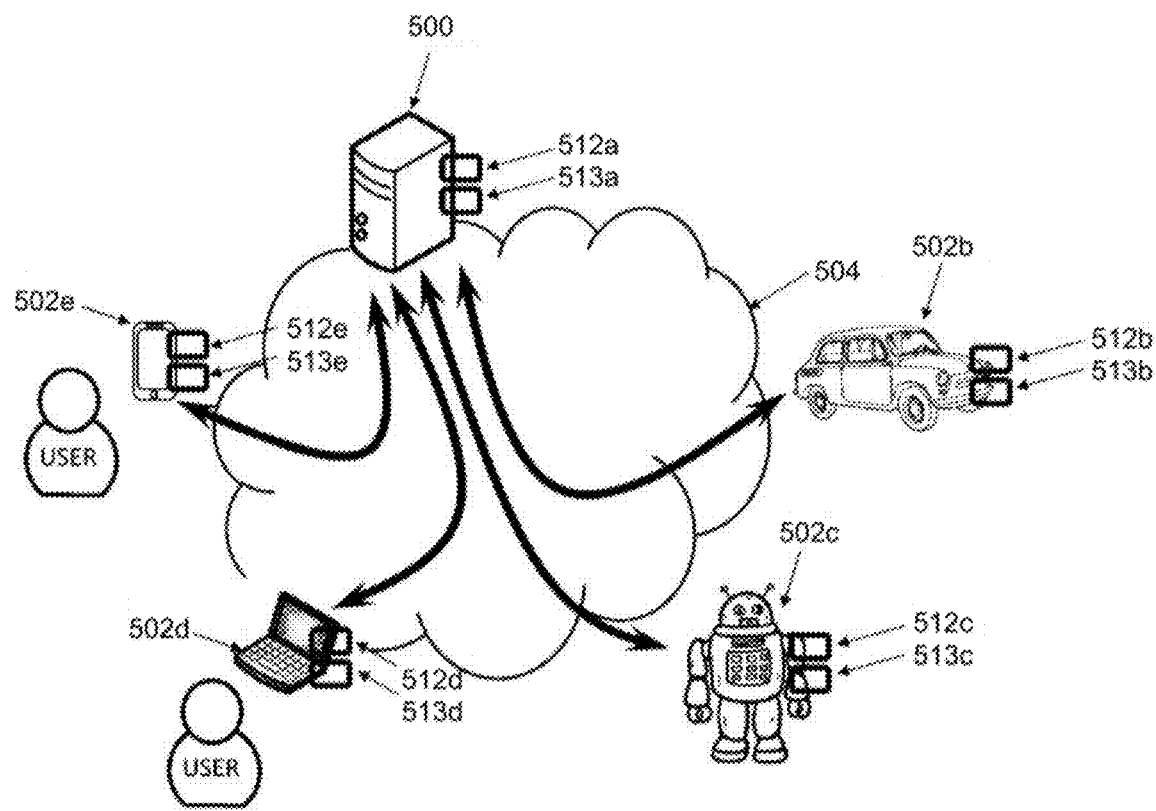
FIG. 7 illustrates an example architecture for performing a method for Point-of-interest recommendation.

FIG. 6 depicts the results of the performance study. The left and right charts report execution time by varying k and r, respectively. Increasing k only influences stage 4 (i.e., mindset maximization). The execution time of all other stages stays constant. The average execution time for the three first stages are 152 ms, 216.25 ms, and 140 ms, respectively. The time for executing the fourth stage grows from 130 ms at k=5 to 621.75 ms at k=70. Note that while the time limit ti is always fixed to 100 ms, stage 4 requires extra time to obtain k' Point-of-interests for each group, generate output, and save it in the storage or on the disk. While k is oblivious to the three first stages of LikeMind, increasing r influences the execution time of all the stages. The reason is that a larger radius implies that more Point-of-interests and consequently more check-ins should be retrieved from the database. The increased number of check-ins makes the group candidate space larger, hence the group generation stage requires more time. The overall execution time of LikeMind grows from 459 ms at r=50 m to 911 ms at r=1 km. r=500 m may be the default value whose collective execution time is on average 620 ms.

While some specific embodiments have been described in detail above, it will be apparent to those skilled in the art that various modifications, variations and improvements of the embodiments may be made in the light of the above teachings and within the content of the appended claims without departing from the intended scope of the embodiments. In addition, those areas in which it is believed that those of ordinary skill in the art are familiar have not been described herein in order to not unnecessarily obscure the embodiments described herein. Accordingly, it is to be understood that the embodiments are not to be limited by the specific illustrative embodiments, but only by the scope of the appended claims.

Although the above embodiments have been described in the context of method steps, they also represent a description of a corresponding component, module or feature of a corresponding apparatus or system.

Some or all of the method steps may be implemented by a computer in that they are executed by (or using) a processor, a microprocessor, an electronic circuit or processing circuitry.

The embodiments described above may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

Generally, embodiments can be implemented as a computer program product with a program code or computer-executable instructions, the program code or computer-executable instructions being operative for performing one of the methods when the computer program product runs on a computer. The program code or the computer-executable instructions may be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor. In a further embodiment, an apparatus comprises one or more processors and the storage medium mentioned above.

In a further embodiment, an apparatus comprises means, for example processing circuitry like, e.g., a processor communicating with a memory, the means being configured to, or adapted to perform one of the methods described herein.

A further embodiment comprises a computer having installed thereon the computer program or instructions for performing one of the methods described herein.

The above-mentioned methods and embodiments may be implemented within an architecture such as illustrated in FIG. 6, which comprises server 500 and one or more client devices 502 that communicate over a network 504 (which may be wireless and/or wired) such as the Internet for data exchange. Server 500 and the client devices 502 include a data processor 512 and memory 513 such as a hard disk. The client devices 502 may be any device that communicates with server 500, including autonomous vehicle 502b, robot 502c, computer 502d, or cell phone 502e.

More precisely in an embodiment, the method according to the embodiments of FIGS. 1-4 may be performed at server 500. In other embodiments, the training and classifying methods according to the embodiments of FIGS. 1-4 may be performed at client device 502. In yet other embodiments, the training and classifying methods may be performed at a different server or on a plurality of servers in a distributed manner.

A novel approach for Point-of-interest recommendation that is based on look-alike groups, which tackles the common challenges of cold start, customizability, contextuality, and explainability, is disclosed. Specifically, an efficient method is disclosed for providing Point-of-interest recommendations in a fast manner. Furthermore, mindset functions allow to extend the user context, and to capture an actual situation, an emotion of a user, and intents of the user. Look-alike groups and mindsets may be time-aware/time-dependent. Moreover, the method and system may comprise setting user-defined constraints on Point-of-interest preferences and mobility patterns to improve the results of Point-of-interest recommendations. Further, transfer-learning approaches may be employed to leverage the abundance of check-ins in public Point-of-interest datasets for the cold start resistant recommendation of Point-of-interests.

The embodiments, described above, outperform current methods comprising personalized and socialized Point-of-interest recommendation approaches, where historical check-ins and social links are exploited to predict which Point-of-interest should be recommended to users. Moreover, Point-of-interest recommendations based on look-alike groups increases security, since users do not have to share personal data to get Point-of-interest recommendations.

It is noted that (A1) Point-of-interest recommendations may be personalized, i.e., the results may be based on user preferences captured in form of user's historical check-ins and interests, (A2) Point-of-interest recommendations may also incorporate social aspects and reflect the preferences of other people similar to the user, since people trust look-alike users (i.e., users of a look-alike group) and base their decisions on what people like them appreciated before, (A3) a Point-of-interest recommendation system may also be exploratory to incorporate user's interactions with the system, i.e., the customization of recommended Point-of-interests, and (A4) Point-of-interest recommendations may also capture a current situation of the user (aka context), which may comprise a user's actual situation and emotion.

The conventional Point-of-interest recommendation approaches do not address all the aforementioned aspects, simultaneously.

In a computer-implemented method of Point-of-interest recommendation comprises: obtaining a plurality of Point-of-interest, for an area, wherein the area is at least one of selected by a user and associated with a location of the user, retrieving Point-of-interest data comprising visitor information about visitors associated with the obtained plurality of Point-of-interests and information about the obtained plurality of Point-of-interests, forming a plurality of groups based at least in part on the visitor information, wherein each group of the plurality of groups is associated with at least one Point-of-interest of the obtained plurality of Point-of-interests, determining one or more groups from the plurality of groups based at least in part on the information about the obtained plurality of Point-of-interests, and providing one or more Point-of-interests of the obtained plurality of Point-of-interests to the user, wherein the one or more Point-of-interests are associated with the determined one or more groups.

By forming a plurality of groups based at least in part on the visitor information, and by determining one or more groups from the plurality of groups based at least in part on the information about the obtained plurality of Point-of-interests, the privacy of a user can be protected, which increases the security. Building look-alike groups allows recommending Point-of-interests that are associated with characteristics of people, e.g., visitors, without relying on any social aspects or check-ins of the user.

Members, e.g., visitors, of a group have at least one characteristic in common, which can be used to explain, label, or express a group and Point-of-interests associated with that group.

According to aspects, the location of the user may be determined by a tracking system, such as a Global Positioning System (GPS) tracking system, and the area may be determined based on the location of the user. In an embodiment, the location of the user is determined by means of a Wi-Fi positioning system.

According to an aspect, the computer-implemented method further comprises determining a mindset function from a plurality of mindset functions, wherein the mindset function comprises one or more predefined functions, e.g., utility functions, and wherein the one or more groups from the plurality of groups are determined based at least in part on the information about the obtained plurality of Point-of-interests and the determined mindset function. Each function of the one or more predefined functions may receive as input at least one variable corresponding to a set of Point-of-interests associated with one or more groups of the plurality of groups.

For example, variables of one or more Point-of-interests associated with the determined one or more groups may maximize the mindset function, wherein the variables are obtained from the information about the obtained plurality of Point-of-interests. Mindsets or mindset functions may be defined to capture an actual situation, an emotion and intents of the user, and may enforce the semantics of Point-of-interest interestingness. By using mindset functions, relevant look-alike groups and their Point-of-interests can be determined in an efficient and effective manner.

According to aspects, the mindset function may be determined based on a user input of the user. The user input may comprise at least one of a selection of a label, e.g., a descriptive label of the mindset function, associated with the mindset function and a selection of a Point-of-interest and/or group previously provided to the user.

Additionally or alternatively, the mindset function may be determined based on at least one of a current time and data associated with the user. The mindset function may comprise one or more weights for each function of the one or more predefined functions, wherein the one or more weights comprise at least one of a predefined weight and a user-specific weight, and wherein the user-specific weight is updated in accordance with inputs of the user.

For example, the user-specific weight may be updated in response to a user selecting or bookmarking a Point-of-interest of Point-of-interests provided to the user.

According to one aspect, the visitor information is associated with a time or a period and is retrieved for a specific time or a specific period at which the visitors have visited the obtained one or more Point-of-interests. This allows for providing precise Point-of-interest recommendations in an efficient and fast manner. For example, the one or more groups may be determined in approximately 100 milliseconds or less. The processing can be performed on small devices, e.g., mobile devices that have limited processing resources. The plurality of groups may be formed by employing a frequent itemset mining, FIM, technique, wherein each group is a frequent itemset, and items comprise demographic attributes of the visitors and Point-of-interests associated with the visitors, wherein the demographic attributes are obtained from the visitor information. The visitor information about the visitors may comprise for each visitor at least one of: a time, a time window and/or a period the visitor has visited a Point-of-interest, an indication of a characteristic of the visitor, all Point-of-interests of the obtained plurality of Point-of-interests the visitor has visited in a specified period, an indication of at least one of a number of photos the visitor took at a Point-of-interest of the obtained plurality of Point-of-interests, a number of photos the visitor has stored on a mobile device of the visitor, a number of photos the visitor has taken in a specified period, and a number of photos the visitor has posted, an indication of a number of friends of the visitor, an indication of a number the visitor has visited a specific Point-of-interest of the obtained Point-of-interests, an age of the visitor, a gender of the visitor, and an indication of a number of trips of the visitor.

According to aspects, the providing one or more Point-of-interests to the user comprises providing a Point-of-interest with most visitors for each group of the one or more groups to the user.

Alternatively or additionally, the one or more Point-of-interests are provided in combination with one or more indications of characteristics of the determined one or more groups. In an embodiment, Point-of-interests (e.g., restaurants, coffee shops, museums) are provided to the user that the user has not visited in a given time window, e.g., 30 days.

According to aspects, the one or more groups are determined based at least in part on the information about the obtained plurality of Point-of-interests and a portfolio of the user, wherein the portfolio comprises an indication of Point-of-interests the user has previously selected and/or visited. The information about the obtained plurality of Point-of-interests may comprise for each Point-of-interest of the obtained one or more Point-of-interests an indication of at least one of: a rating score, one or more categories, a price range, opening hours, rush hours, a total number of visitors, payment modalities, handicap accessibility, parking availability, an insertion date, and a size of a respective Point-of-interest. In another embodiment, the one or more groups are determined based on the information about the obtained plurality of Point-of-interests and not a portfolio of the user. For example, the one or more groups may be determined based only on the information about the obtained plurality of Point-of-interests such that no personal information of the user is used to determine the one or more groups. Thus, no sensitive personal data needs to be transmitted or obtained, which increases security by protecting a user's privacy.

According to aspects, the computer-implemented method may be an iterative method, wherein in response to the user selecting a Point-of-interest from the one or more provided Point-of-interests or a group of the one or more determined groups, one or more updated groups are determined and one or more updated Point-of-interests associated with the determined one or more updated groups are provided to the user in accordance with at least some steps of the same method.

For example, the at least some steps may comprise determining the one or more updated groups from the plurality of groups or a plurality of updated groups based at least in part on the information about the obtained plurality of Point-of-interests and the user selection of the Point-of-interest from the one or more provided Point-of-interests or the group of the one or more determined groups, and providing the one or more updated Point-of-interests of the obtained plurality of Point-of-interests or newly obtained Point-of-interests to the user, wherein the one or more updated Point-of-interests are associated with the determined one or more updated groups. User interactions may affect the way look-alike groups are selected.

In a further embodiment, a computer-readable storage medium having computer-executable instructions stored thereon is provided. When executed by one or more processors, the computer-executable instructions perform the method for Point-of-interest recommendation described above.

In a further embodiment, an apparatus comprising processing circuitry is provided. The processing circuitry is configured to perform the method for Point-of-interest recommendation described above.

A computer-implemented method for accurately and efficiently generating ambient point-of-interest recommendations, comprising: (a) electronically obtaining a plurality of points-of-interest for an area, the area being an area selected by a user associated with a location of the user; (b) electronically retrieving point-of-interest data including visitor information about visitors associated with the obtained plurality of points-of-interest and information about the obtained plurality of points-of-interest; (c) electronically forming a plurality of groups based upon the visitor information, each group of the plurality of groups being associated with a point-of-interest of the obtained plurality of points-of-interest; (d) electronically determining a mindset function from a plurality of mindset functions, the mindset function including a predefined function; (e) electronically determining a group from the plurality of groups based upon the information about the obtained plurality of points-of-interest and the determined mindset function; and (f) communicating a point-of-interest of the obtained plurality of points-of-interest to the user, the point-of-interest being associated with the determined group.

The method may receive a user input of the user, the mindset function being determined based on the user input of the user, the user input including a selection of a label associated with the mindset function and a selection of a point-of-interest or a group previously provided to the user.

The mindset function may be determined based upon a current time and data associated with the user, and variables of a point-of-interest associated with the group maximizing the mindset function, the variables being obtained from the information about the obtained plurality of point-of-interest.

The mindset function may include a weight for each function of the predefined functions, the weight including a predefined weight and a user-specific weight, the user-specific weight being updated in accordance with inputs of the user.

The mindset function may be determined based upon a current time and data associated with the user.

The variables of a point-of-interest associated with the group may maximize the mindset function, the variables being obtained from the information about the obtained plurality of points-of-interest.

Each function of the predefined functions may receive as input a variable corresponding to a set of points-of-interest associated with a group of the plurality of groups and each function of the predefined functions is defined as: a normalized average number of visitors of the set of points-of-interest, a normalized average rating score of the set of points-of-interest, an inverse difference between a current date and an average insertion date of the set of points-of-interest, an area of a polygon induced by a geographical location of points-of-interest in the set of points-of-interest normalized by a size of a city, a normalized Jaccard distance between point-of-interest categories of the set of points-of-interest and point-of-interest categories of points-of-interest visited by the user, a normalized Jaccard similarity between a set category and categories of the set of points-of-interest, a normalized Jaccard distance between sets of point-of-interest categories in the set of points-of-interest, and a normalized average radius of points-of-interest in the set of points-of-interest.

The visitor information may be associated with a time or a period, the visitor information being retrieved for a specific time or a specific period at which the visitor has visited the obtained point-of-interest.

The plurality of groups may be formed by employing a frequent itemset mining technique, each group being a frequent itemset, items including demographic attributes of the visitors and points-of-interest associated with the visitors, the demographic attributes being obtained from the visitor information.

The points-of-interest may be provided in combination with an indication of characteristics of the determined group.

The group may be determined based upon the information about the obtained plurality of points-of-interest and a portfolio of the user, the portfolio including an indication of points-of-interest the user has previously selected and/or visited.

The group may be determined based on the information about the obtained plurality of points-of-interest such that privacy of the user is protected.

The method may determine the location of the user. The method may determine the area based on a predefined radius from the location of the user. The method may determine the area based on a predefined radius from the location of the user.

The visitor information about the visitors may include, for each visitor, a time the visitor has visited a point-of-interest.

The visitor information about the visitors may include, for each visitor, an indication of a characteristic of the visitor.

The visitor information about the visitors may include, for each visitor, all points-of-interest of the obtained plurality of points-of-interest the visitor has visited in a specified period of time, The visitor information about the visitors may include, for each visitor, an indication of a number of photos the visitor took at a point-of-interest of the obtained plurality of points-of-interest.

The visitor information about the visitors may include, for each visitor, an indication of a number of friends of the visitor.

The visitor information about the visitors may include, for each visitor, an indication of a number of times the visitor has visited a specific point-of-interest of the obtained points-of-interest.

The visitor information about the visitors may include, for each visitor, an age of the visitor.

The visitor information about the visitors may include, for each visitor, a gender of the visitor.

The visitor information about the visitors may include, for each visitor, an indication of a number of trips of the visitor.

The information about the obtained plurality of points-of-interest may include, for each point-of-interest of the obtained points-of-interest, an indication of a rating score.

The information about the obtained plurality of points-of-interest may include, for each point-of-interest of the obtained points-of-interest, a category.

The information about the obtained plurality of points-of-interest may include, for each point-of-interest of the obtained points-of-interest, a price range.

The information about the obtained plurality of points-of-interest may include, for each point-of-interest of the obtained points-of-interest, opening hours.

The information about the obtained plurality of points-of-interest may include, for each point-of-interest of the obtained points-of-interest, rush hours.

The information about the obtained plurality of points-of-interest may include, for each point-of-interest of the obtained points-of-interest, a total number of visitors.

The information about the obtained plurality of points-of-interest may include, for each point-of-interest of the obtained points-of-interest, payment modalities.

The information about the obtained plurality of points-of-interest may include, for each point-of-interest of the obtained points-of-interest, handicap accessibility.

The information about the obtained plurality of points-of-interest may include, for each point-of-interest of the obtained points-of-interest, parking availability.

The information about the obtained plurality of points-of-interest may include, for each point-of-interest of the obtained points-of-interest, a size of a respective point-of-interest.

It will be appreciated that variations of the above-disclosed embodiments and other features and functions, and/or alternatives thereof, may be desirably combined into many other different systems and/or applications. Also, various presently unforeseen and/or unanticipated alternatives, modifications, variations, and/or improvements therein may be subsequently made by those skilled in the art which are also intended to be encompassed by the description above and the following claims.

What is claimed is:

1. A computer-implemented method for generating ambient point-of-interest recommendations for a user, the method comprising:
   (a) receiving, through a receiver, an electronic positioning signal from a positioning system;
   (b) electronically, using a processor and a memory, to determine a location of the user based upon the received electronic positioning signal from the positioning system and an area, the area being associated with the determined location of the user;
   (c) electronically obtaining, using a processor and a memory, a plurality of points-of-interest for the determined are;
   (d) electronically retrieving, using a processor and a memory, point-of-interest data and information about the obtained plurality of points-of-interest in the determined area, the point-of-interest data including visitor information about visitors associated with the obtained plurality of points-of-interest;

(e) electronically forming, using a processor and a memory, a plurality of groups based upon the retrieved visitor information, each group being associated with a point-of-interest in the determined area;

(f) electronically determining, in response to the user inputting information through an input interface, a mindset function from a plurality of mindset functions;

(g) electronically determining, using a processor and a memory, a group from the plurality of groups, based upon the information about the points-of-interest in the determined area and the determined mindset function; and (h) communicating, using a processor and a memory, a point-of-interest, in the determined area, to the user, the point-of-interest being associated with the determined group.

2. The method as claimed in claim 1, wherein the mindset function is further determined based upon the user inputting a selection of a label associated with the mindset function and a selection of a point-of-interest.

3. The method as claimed in claim 1, wherein the mindset function is further determined based upon the user inputting a selection of a label associated with the mindset function and a group previously provided to the user.

4. The method as claimed in claim 1, wherein the mindset function is further determined based upon a current time, data associated with the user, and variables of a point-of-interest associated with the group which maximizes the mindset function, the variables being obtained from the information about the obtained plurality of point-of-interest.

5. The method as claimed in claim 1, wherein the mindset function includes a weight for each function, the weight including a predefined weight and a user-specific weight, the user-specific weight being updated in accordance with inputs of the user.

6. The method as claimed in claim 1, wherein the electronic positioning signal is a GPS signal.

7. The method as claimed in claim 1, wherein the mindset function is further determined based upon a current time and data associated with the user.

8. The method as claimed in claim 1, wherein the electronic positioning signal is a Wi-Fi positioning signal.

9. The method as claimed in claim 1, wherein the mindset function is further determined based upon variables of a point-of-interest associated with the group which maximizes the mindset function, the variables being obtained from the information about the obtained plurality of points-of-interest.

10. The method as claimed in claim 1, wherein the mindset function is further determined based upon the user inputting a selection of a label associated with the mindset function, a user selected point-of-interest, and a group previously provided to the user.

11. The method as claimed in claim 1, wherein each mindset function receives as input a variable corresponding to a set of points-of-interest associated with a group of the plurality of groups and each mindset function is defined as:

a normalized average number of visitors of the set of points-of-interest, a normalized average rating score of the set of points-of-interest, an inverse difference between a current date and an average insertion date of the set of points-of-interest, an area of a polygon induced by a geographical location of points-of-interest in the set of points-of-interest normalized by a size of a city, a normalized Jaccard distance between point-of-interest categories of the set of points-of-interest and point-of-interest categories of points-of-interest visited by the user, a normalized Jaccard similarity between a set category and categories of the set of points-of-interest, a normalized Jaccard distance between sets of point-of-interest categories in the set of points-of-interest, and a normalized average radius of points-of-interest in the set of points-of-interest.

12. The method as claimed in claim 1, wherein the visitor information is associated with a time, the visitor information being retrieved for a specific time at which the visitor has visited the obtained point-of-interest.

13. The method as claimed in claim 1, wherein the visitor information is associated with a period of time, the visitor information being retrieved for a specific period of time at which the visitor has visited the obtained point-of-interest.

14. The method as claimed in claim 1, wherein the plurality of groups are formed by employing a frequent itemset mining technique, each group being a frequent itemset, items including demographic attributes of the visitors and points-of-interest associated with the visitors, the demographic attributes being obtained from the visitor information.

15. The method as claimed in claim 1, wherein communicating a point-of-interest to the user includes communicating a point-of-interest with a highest number of visitors for each group.

16. The method as claimed in claim 1, wherein points-of-interest are communicated in combination with an indication of characteristics of the determined group.

17. The method as claimed in claim 15, wherein points-of-interest are communicated in combination with an indication of characteristics of the determined group.

18. The method as claimed in claim 1, wherein the group is determined based upon the information about the obtained plurality of points-of-interest and a portfolio of the user, the portfolio including an indication of points-of-interest the user has previously selected and/or visited.

19. The method as claimed in claim 1, wherein the group is determined based on the information about the obtained plurality of points-of-interest such that privacy of the user is protected.

20. The method as claimed in claim 18, wherein the group is determined based on the information about the obtained plurality of points-of-interest such that privacy of the user is protected.

21. The method as claimed in claim 1, wherein the determined area is based on a predefined radius from the determined location of the user.

22. The method as claimed in claim 1, wherein the visitor information about the visitors includes, for each visitor, a time the visitor has visited a point-of-interest.

23. The method as claimed in claim 1, wherein the visitor information about the visitors includes, for each visitor, an indication of a characteristic of the visitor.

24. The method as claimed in claim 1, wherein the visitor information about the visitors includes, for each visitor, all points-of-interest in the determined area that the visitor has visited in a specified period of time.

25. The method as claimed in claim 1, wherein the visitor information about the visitors includes, for each visitor, an indication of a number of photos the visitor took at a point-of-interest in the determined area.

26. The method as claimed in claim 1, wherein the visitor information about the visitors includes, for each visitor, an indication of a number of friends of the visitor.

27. The method as claimed in claim 1, wherein the visitor information about the visitors includes, for each visitor, an indication of a number of times the visitor has visited a specific point-of-interest in the determined area.

28. The method as claimed in claim 1, wherein the visitor information about the visitors includes, for each visitor, an age of the visitor.

29. The method as claimed in claim 1, wherein the visitor information about the visitors includes, for each visitor, a gender of the visitor.

30. The method as claimed in claim 1, wherein the visitor information about the visitors includes, for each visitor, an indication of a number of trips of the visitor.

31. The method as claimed in claim 1, wherein the information about the points-of-interest in the determined area includes, for each point-of-interest in the determined area, an indication of a rating score.

32. The method as claimed in claim 1, wherein the information about the points-of-interest in the determined area includes, for each point-of-interest in the determined area, a category.

33. The method as claimed in claim 1, wherein the information about the plurality of points-of-interest in the determined area includes, for each point-of-interest in the determined area, a price range.

34. The method as claimed in claim 1, wherein the information about the plurality of points-of-interest in the determined area includes, for each point-of-interest in the determined area, opening hours.

35. The method as claimed in claim 1, wherein the information about the plurality of points-of-interest in the determined area includes, for each point-of-interest in the determined area, rush hours.

36. The method as claimed in claim 1, wherein the information about the plurality of points-of-interest in the determined area includes, for each point-of-interest in the determined area, a total number of visitors.

37. The method as claimed in claim 1, wherein the information about the points-of-interest in the determined area includes, for each point-of-interest in the determined area, payment modalities.

38. The method as claimed in claim 1, wherein the information about the points-of-interest in the determined area includes, for each point-of-interest in the determined area, handicap accessibility.

39. The method as claimed in claim 1, wherein the information about the plurality of points-of-interest in the determined area includes, for each point-of-interest in the determined area, parking availability.

40. The method as claimed in claim 1, wherein the information about the plurality of points-of-interest in the determined area includes, for each point-of-interest in the determined area, a size of a respective point-of-interest.

* * * * *